United States Patent
Krishnaswami

(10) Patent No.: US 10,147,335 B2
(45) Date of Patent: Dec. 4, 2018

(54) EDUCATION DATA PLATFORM TO SUPPORT A HOLISTIC MODEL OF A LEARNER

(71) Applicant: Lakshmi Arthi Krishnaswami, New York, NY (US)

(72) Inventor: Lakshmi Arthi Krishnaswami, New York, NY (US)

( * ) Notice: Subject to any disclaimer, the term of this patent is extended or adjusted under 35 U.S.C. 154(b) by 133 days.

(21) Appl. No.: 15/211,680

(22) Filed: Jul. 15, 2016

(65) Prior Publication Data
US 2018/0018890 A1   Jan. 18, 2018

(51) Int. Cl.
G09B 7/02 (2006.01)
G09B 5/08 (2006.01)
G09B 19/00 (2006.01)

(52) U.S. Cl.
CPC .............. *G09B 5/08* (2013.01); *G09B 19/00* (2013.01)

(58) Field of Classification Search
CPC ........................................................ G09B 7/02
See application file for complete search history.

(56) References Cited

U.S. PATENT DOCUMENTS

| | | | |
|---|---|---|---|
| 6,270,351 B1 | 8/2001 | Roper | |
| 8,457,544 B2 | 6/2013 | German et al. | |
| 8,666,299 B2 | 3/2014 | Botha et al. | |
| 8,812,588 B2 | 8/2014 | Dutton et al. | |
| 2002/0178038 A1 | 11/2002 | Grybas | |
| 2003/0113697 A1 | 6/2003 | Plescia | |
| 2004/0044684 A1 | 3/2004 | Easter et al. | |
| 2004/0110119 A1 | 6/2004 | Riconda et al. | |
| 2010/0159437 A1* | 6/2010 | German | G06Q 30/02 434/433 |
| 2010/0279264 A1 | 11/2010 | Barazanji | |
| 2013/0110737 A1 | 5/2013 | Shustorovich et al. | |
| 2014/0272911 A1 | 9/2014 | York et al. | |

OTHER PUBLICATIONS

Developing Mind Software, DDtrac, archive.org, Apr. 2011, pp. 1-4.
Abrami, Directions for Research and Development on Electronic Portfolios, Canadian Journal of Learning and Technology, vol. 31(3), Fall / autumn 2005, p. 4.

* cited by examiner

*Primary Examiner* — Omkar Deodhar
(74) *Attorney, Agent, or Firm* — Chinta Perdomo; Berks & Frayangello LLP

(57) ABSTRACT

A computer-implemented holistic student performance management system for education is provided for tracking, analyzing and reporting student data. The system identifies at-risk students and student needs, and generates recommended interventions based on student's academic and non-academic experience and needs to address these needs. The system enables tracking of the interventions, student performance and behavior for all student populations.

11 Claims, 22 Drawing Sheets

Student 1's English/Language Arts Action Plan

| | |
|---|---|
| Gender | Female |
| Zip | 10023 |
| RTI Tier | 2 |
| Start Date | 02/12/2016 |
| End Date | 06/20/2016 |
| Area(s) of Concern | Phonics |
| | Reading Fluency |
| History | history |
| Data - Based Decision | data |
| Goal of Plan | goal |
| Progress Monitor # 1 | |
| Title | Nonsense Word Fluency - Correct Letter Sounds: 1st grade |
| Current | 20.0 |
| Goal | 49.0 |
| Intervention # 1 | reading (computer program) |
| Start Time | 9:00 AM |
| Duration | 1 hours |
| Frequency | daily |
| Data / Goal / Outcome | data / goal / outcome |
| Intervention # 2 | one on one tutoring |
| Start Time | 9:30 AM |
| Duration | 30 minutes |
| Frequency | weekly |
| Data / Goal / Outcome | goal |

1 : Nonsense Word Fluency - Correct Letter Sounds: 1st grade CSV    Update Progress
Starting on 02 / 12 /2016 for 4 months

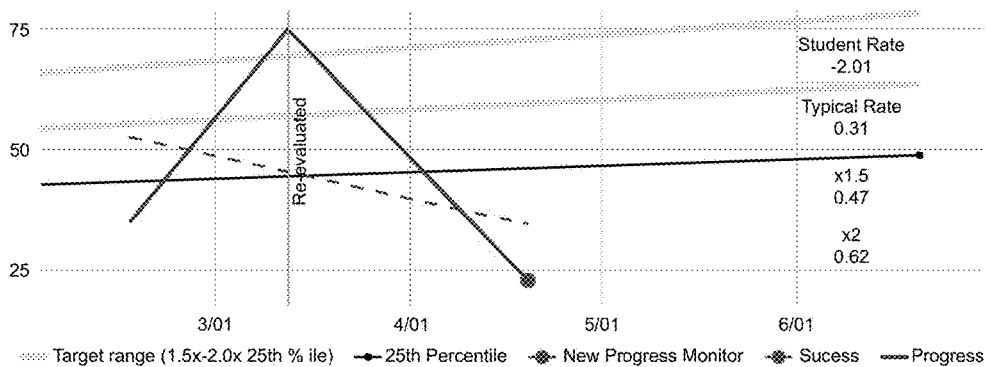

EDUCATION DATA PLATFORM TO SUPPORT A HOLISTIC MODEL OF A LEARNER

FIELD OF THE INVENTION

This invention relates generally to the field of learning analytics. More specifically, the invention relates to computer-implemented systems for analyzing and modeling a learner's characteristics and performance in both academic and non-academic aspects.

BACKGROUND

The tasks of collecting, accessing, tracking and reporting student data, so as to provide educators, counselors, and parents and the students themselves—with an up-to-date picture of students' status, problems, progress, and recommendations present difficulties that have typically been addressed with a variety of computerized database systems. See, for example, U.S. Patent Application Publication Nos. 2002/0178038 and 2004/0110119, and U.S. Pat. No. 6,270,351. Such systems tend to be specialized for particular student needs (e.g., special education students), for particular stakeholders in the education process (e.g., school administrators, teachers, counselors, parents, third-party service providers and students), or for particular aspects of the student experience (e.g., academic or social). Issues of confidentiality, privacy, professional standards, and state and federal statutes aimed at protecting privacy, have put much of the data out of the sight of stakeholders other than those for whom each database system was initially designed. There are also multiple systems focused on discrete aspects of student life such as academic, social, and behavioral. This results in a considerable amount of redundant data collection. Inconsistencies between such databases are not readily detectable, and information important to a stakeholder who is nominally permitted access to it may be unavailable by reason of being in an inaccessible database. Similarly, synergies and interdependencies between such databases and data are also not readily detectable.

Students' individual needs or gifts may qualify particular students for particular programs, based on qualification criteria typically designated by a state board of education. Similarly, students' experience and interests outside of the relevant academic standards, e.g., extra-curricular activities or experiences at home, may qualify particular students for particular programs. Periodic evaluations and assessments of students' skills, needs and progress are typically part of such programs. Approvals and permissions of teachers, parents, and/or guardians are typically required. Analyzing and assimilating the non-academic aspects along with the academic aspects of students' life so as to make appropriate recommendations and interventions is also required. Moreover, gathering all of the required information, making it available to all of the involved parties, and tracking the status of in-process permissions can be a convoluted and time-consuming enterprise, particularly for teachers and administrators who must carry out these tasks for large numbers of students.

Accordingly, there remains a need for a single, centralized system containing all information relevant to students' education and holistic development academic as well as non-academic which can be accessed by all stakeholders. There is a need for a system that makes available to stakeholders all of the information which they are entitled to access or are permitted to access, within the bounds of the pertinent standards and regulations for student and family privacy and confidentiality.

SUMMARY OF THE INVENTION

The following presents a simplified summary relating to one or more aspects and/or embodiments disclosed herein. As such, the following summary should not be considered an extensive overview relating to all contemplated aspects and/or embodiments. Nor should the following summary be regarded to identify key elements relating to all contemplated aspects and/or embodiments or to delineate the scope associated with any particular aspect and/or embodiment.

According to one exemplary aspect, the disclosure relates to an intervention guiding, tracking and management system for education that brings together a complete picture of the student including but not limited to social, emotional, behavioral, academic, health and wellness, vocational, and skills-based information. The system brings disparate functionalities together into a single workflow that helps students, schools, families, and service providers work together to track student progress, and provides guidance and support for interventions. The system includes interventions and tracking for all student populations, unlike traditional systems that are built for one specific population. For example, the system of the invention supports at-risk, special need, and general education students; tiered intervention, individualized education, and section 504 plans; as well as ESL, free/reduced lunch, foster youth and transitional home environment programs.

According to another exemplary aspect of the disclosure, the system combines all of these variables into a single record, provides guidance regarding recommended interventions, and enables tracking of all types of interventions in order to build a multi-dimensional model of the student. According to another aspect of the disclosure, the system provides visualizations of the student records, enabling better understanding and engagement for parents, teachers and others involved.

According to another aspect of the disclosure, the system provides a circle of support for the learner, comprising in and out of school caregivers, that considers both academic and non-academic aspects, such as the learner's behavioral habits and issues, individual needs and experiences (e.g., plays video games), and family needs and experiences (e.g., single parent home). According to still another aspect of the disclosure, the system provides a single platform for disparate groups of education professionals, each with different levels of privacy access, to track information about student activities, meetings, events, interactions, and interventions. The system helps to identify unknown service capacity gaps and support services to aid students, empower families, and promote better relationships between schools, communities, and parents. Further objects, features, and advantages of the invention will become apparent from a consideration of the drawings and the ensuing detailed description.

BRIEF DESCRIPTION OF THE FIGURES

FIG. 13 is a sample action plan and visualization of progress monitors for a student, in accordance with one embodiment of the invention.

FIG. 16 presents a sample activity feed page generated by the education data platform system of FIG. 1, in accordance with one embodiment of the invention.

DETAILED DESCRIPTION OF THE INVENTION

The following detailed description and accompanying drawings disclose various aspects and/or embodiments of the invention. Alternate aspects and/or embodiments may be devised without departing from the scope of the disclosure. Additionally, well-known elements of the disclosure are not described in detail or have been omitted so as not to obscure the relevant details of the disclosure.

The words "exemplary," "e.g.," "such as," and/or "example" are used herein to mean "serving as an example, instance, or illustration." Any aspect or embodiment described herein as "exemplary," "e.g.," "such as," and/or "example" is not necessarily to be construed as preferred or advantageous over other aspects or embodiments. Likewise, the term "aspect/embodiment of the disclosure/invention" does not require that all aspects or embodiments include the discussed feature, advantage or mode of operation.

Further, many aspects and embodiments are described in terms of sequences of actions to be performed by, for example, elements of a computing device. It will be recognized that various actions described herein may be performed by program instructions being executed by one or more processors, by specific circuits (e.g., an application specific integrated circuit (ASIC)), or by a combination of both. Thus, the various aspects of the disclosure may be embodied in a number of different forms and exemplary embodiments, all of which are contemplated to be within the scope of the claimed subject matter. In addition, for each of the aspects or embodiments described herein, the corresponding form of any such aspects or embodiments may be described herein as, for example, "logic configured to" perform the described action.

As used herein, the term "event" refers to interactions between students, parents, school personnel, and/or service providers. As used herein, the term "notes" refers to text or data entries that are treated as events by the system but which may consist of reminders, observations, communications, time, date and/or other events not falling under an established category. As used herein, the term "activity" refers to any activity related to a student, including notes, events, progress monitoring, tracking and/or intervention. The terms "student" and "learner" are used interchangeably.

Figure 1:
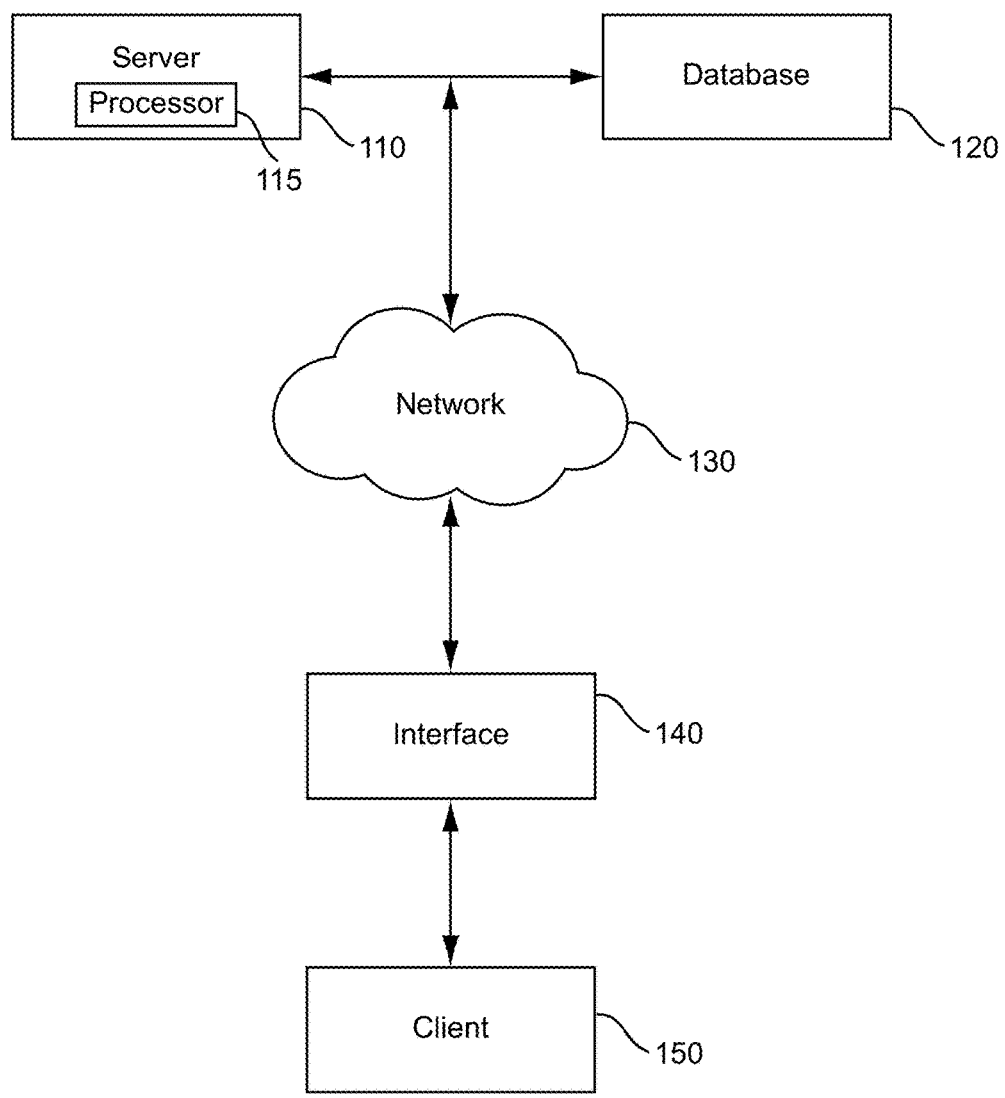
FIG. 1 is a schematic illustration of high-level system architecture of an education data platform, in accordance with one embodiment of the invention.

In accordance with an aspect of the disclosure, a system and method for tracking all aspects of information about a student so as to obtain a holistic picture of the student and make appropriate recommendations or interventions based on that information is disclosed. With reference to FIG. 1, an exemplary educational data platform system 100 in accordance with one embodiment of the invention is disclosed. The system 100 comprises one or more servers 110, one or more databases 120, a network 130, and an interface 140 through which a client 150 may access the database.

The technology architecture of the system is SAAS (Software as a Service), a software distribution model in which applications are hosted by a vendor or service provider and made available to customers over a network. One of the unique aspects of the education data platform is that the concept of education as a service treats the student as the center, and each "provider" (family, parent, school, or service providers) as a service. This architecture enables flexible sharing of APIs, and delivery of features in APP, web, SMS, and tablet-based environments. The architecture comprises a database 120, preferably built with an open source DBMS such as Postgres (PostgreSQL). On the server side, a web application framework written in Ruby ("Ruby on Rails") provides web page structures for the database 120. On the client side, web application frameworks such as AngularJS and Ionic are used to provide users of the system with browser-based and mobile interfaces.

The servers 110 include a computer having one or more processors 115 where the monitoring, management, recommending, and reporting actions are performed. The server 110 may be, for example, a networked data server, a personal computer, a mobile computing device etc. The network server may be of any type suitable for use with a cloud-based web application platform. The processor 115 executes software for processing requests, analyzing data, tracking interventions, and providing recommendation choices or options. The processor 115 communicates with the database 120 and the server 110. The system may include one or more servers. For example, the system may include one server for data storage and multiple web servers for front-end and other processing. The server 110 stores and runs all the software needed to track the student data and interventions, access recommendations, and perform other functions of the system. In an alternative embodiment, the database also runs on one or more of the web servers.

The database 120 stores information about one or more students and service providers. Various pieces of data may be stored in the same database or in different databases. For example, larger files such as images (e.g., student pictures) may be stored in one place, e.g. Amazon™ Web Services platform, and small files may be stored in another place. Various data may also be stored in different formats. For example, personal information related to the students or learners, or emergency contact information may be encrypted while the rest of the data may not be. Alternately, selected fields may be encrypted or all data may be encrypted. In one embodiment, encrypted data is stored in a hosting system such as HEROKU and non-encrypted data is stored in a different cloud-based storage. The database 120 relies upon one or more non-volatile storage devices for storing the information.

The database 120 stores various data related to students or other learners. This includes demographic data such as grades and school; special needs data such as learning disability; experiential data such as plays games daily; interest data such as likes art; past history data such as intervention programs used; and other data. The database 120 also stores various data related to providers such as teachers, social workers, tutors, behavior specialists etc. The information stored includes demographic information such as name and contact information of the provider as well as subject matter information such as programs offered by the provider, students tutored by the provider in the past etc. All the data stored in the database 120 is searchable and in interoperable formats, cross-referenced and/or tagged with metadata to enable searching. This allows the user to make important determinations. For example, the user can associate which student with specific experiences used which intervention program at what time.

The network 130 may be any wired or wireless interface that enables communication between digital devices such as LAN, WLAN, WSN, broadband, Bluetooth, Near Field Communication (NFC) etc.

The interface 140 may be any user interface such as a keypad or a graphical user interface or a mobile device. The interface 140 communicates with the database 120 and the server 110. The interface has at least one application, e.g. a mobile application or a browser, that interprets the incoming data or visuals from the server 110.

The client 150 may be any person using the system, such as a parent, teacher, provider, school administrator or student.

Figure 2:
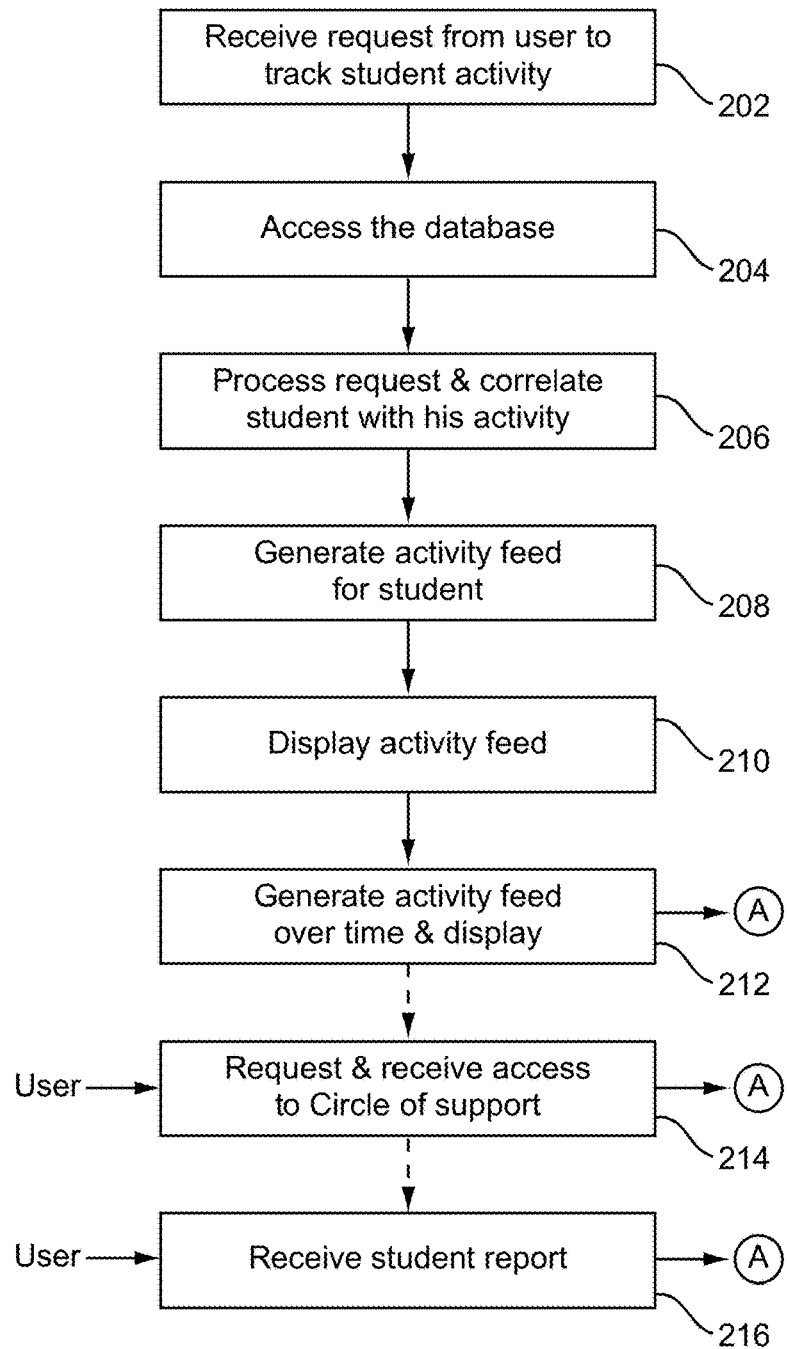
FIG. 2 is a flow chart of the method used by the education data platform system of FIG. 1 for tracking a student's activity and progress in various academic and non-academic categories, in accordance with one embodiment of the invention.

FIG. 2 shows the operation of the education data platform system 100 when tracking a student's activity and progress in various academic and non-academic categories, in accordance with one embodiment of the invention. At step 202, the server 110 receives a request from the user 150 to track the activity of a student. At step 204, the server accesses the database 120. At step 206, the processor in the server 110 processes the request and correlates the student with his or her activities/events across all fields. At step 208, the processor generates an activity feed for the student. At step 210, the system 100 displays the activity feed for a default time period to the user. The activity feed may be displayed as a text based list (see FIG. 16), a line plot, a scatter plot or a bar chart as shown in FIGS. 4-7. The user then selects a student and at step 212, the system generates the activity feed over a period of time for that student and displays it to the user.

At step 214, the user may request and access a "circle of support" for the student. The circle of support comprises one or more caregivers and/or providers that support the student's development. For example, the circle may include a teacher, a tutor, a social worker, a counselor etc. In accordance with one embodiment of the invention, the default view is the activity feed of the student. The user may access the circle of support directly without accessing the activity feed first. At step 216, the user may request directly from a "Reports" tab (see FIG. 12), without accessing the activity feed, a report for any specific student, school or over time for all events aggregated and/or specific events.

Figure 3:
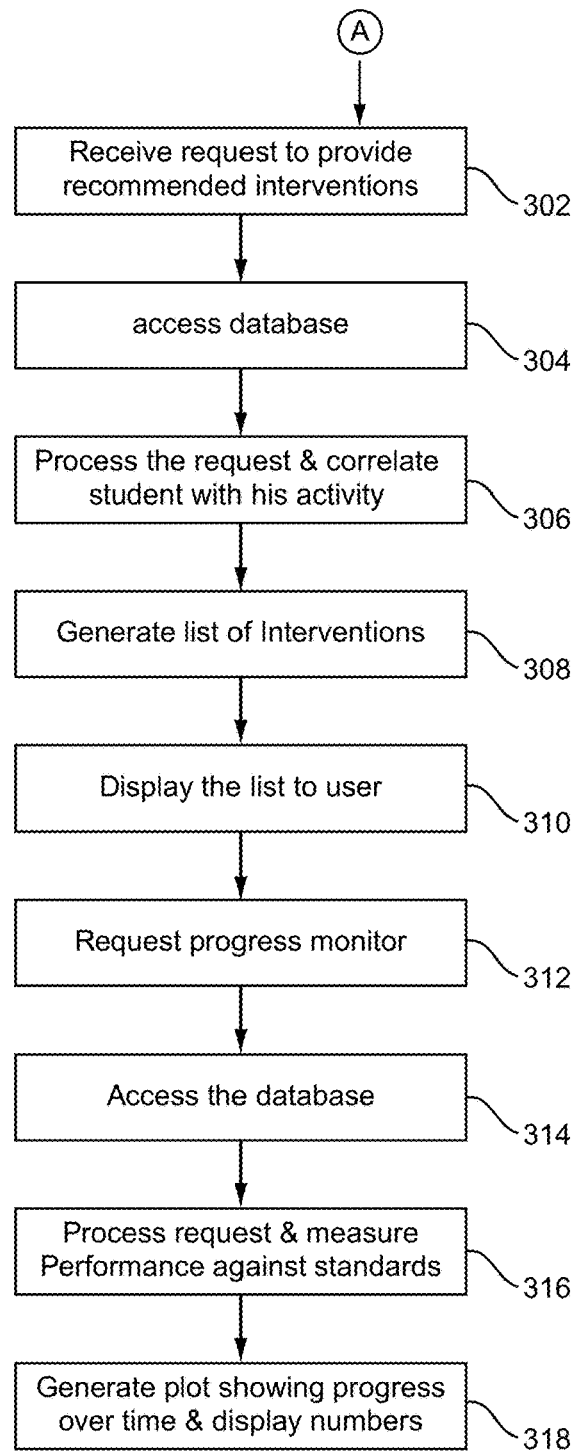
FIG. 3 is a flow chart of the method used by the education data platform system of FIG. 1 for providing recommended interventions for a student based on the student's holistic activity and progress, in accordance with one embodiment of the invention.

FIG. 3 shows the operation of the education data platform system 100 for providing recommended interventions for a student based on the student's holistic activity and progress, in accordance with one embodiment of the invention. At step 302, the server 110 receives a request from the user 150 to provide recommended interventions for a student. The user may make this request after step 212, 214 or 216. Alternately, the user may make this request as the initial request. At step 304, the server accesses the database 120. At step 306, the processor in the server 110 processes the request and correlates the student with his or her activities/events across all fields and possible interventions. At step 308, the processor generates a list of interventions for the student. At step 310, the system 100 displays the intervention list to the user who may then choose one of the suggested interventions. The interventions may be academic, e.g., Math or English as Second Language (ESL), or non-academic, e.g., behavioral, extra-curricular activity, family counseling, family situations etc. At optional step 312, the user may request a progress monitor to track the progress a student is making from using the interventions. The user may use an existing progress monitor or create customized monitors. At step 314, the server accesses the database 120 to obtain the progress monitors and/or to store the generated customized list.

At step 316, the processor in the server 110 processes the request and measures the student's performance on the interventions against selected pre-existing or customized standards, benchmarks, and monitoring frameworks over time (see FIG. 13). The system recommends service providers, action plans, and interventions based on a novel multi-factor algorithm. The system builds its recommendations using a combination of student characteristics and experiences, including demographics, student and family needs assessment data, IEP and 504 status, English Language Learner status, qualification for free and reduced-price lunches, living situation, event tracking data from in and out of school services, academic action plan data, behavior tracking data, and other emerging metrics. The circle of support is comprised of human and non-human resources and providers that offer services in and out-of-school. The student or learner and his/her advocates have the power to modify and adapt the circle of support membership based on observational, quantitative and qualitative data.

A representative example of how the student's performance is measured and processed to ultimately yield the recommendations is provided in the annotated extract of code that follows. Lines of annotation are preceded with "#":

```
---------------------------------
  # shows recommendations based on student characteristics or needs
if ['IEP','Section 504'].include?(self.program.name)
    roles.add(Role.find_by_name('Special Education Coordinator'))
    roles.add(Role.find_by_name('Transition Coordinator')) if self.age > 14
end
if self.grade == '12'
    roles.add(Role.find_by_name('College'))
end
if self.school_work_difficulty
    roles.add(Role.find_by_name('Tutor'))
    roles.add(Role.find_by_name('Online Educational Resources'))
end
if self.acting_out_anywhere
    roles.add(Role.find_by_name('Counselor / Therapist'))
end
needed_roles = self.survey_responses.select { |x| x.survey_answer.resource_list
}.map { |x| x.survey_answer.resource_list.split(',') }.flatten.uniq
needed_roles.each do |role|
    role = Role.find_by_name(role)
    roles.add(role) if role
end
-----------------------------------------------
# shows recommendations based on needs and experiences from Needs Mapper
responses
SurveyQuestion.find_or_initialize_by(id_tag: "first").tap do |sq|
    sq.body = "[Student] has trouble getting up in the morning."
    sq.order = 1
    sq.question_type = "single"
    sq.survey_answers.find_or_initialize_by(order: 1, body: "never")
    sq.survey_answers.find_or_initialize_by(order: 2, body: "once or twice a semester")
    sq.survey_answers.find_or_initialize_by(order: 3, body: "monthly")
    sq.survey_answers.find_or_initialize_by(order: 4, body: "weekly")
    sq.survey_answers.find_or_initialize_by(order: 5, body: "once or twice a week")
    sq.survey_answers.find_or_initialize_by(order: 6, body: "daily", resource_list: "School Counselor")
    sq.save!
end
SurveyQuestion.find_or_initialize_by(id_tag: "there-at-home").tap do |sq|
    sq.body = "I am at home in the morning when [Student] leaves for school."
    sq.order = 2
    sq.question_type = "single"
    sq.survey_answers.find_or_initialize_by(order: 1, body: "never", resource_list: "School Counselor")
    sq.survey_answers.find_or_initialize_by(order: 2, body: "once or twice a semester")
    sq.survey_answers.find_or_initialize_by(order: 3, body: "monthly")
    sq.survey_answers.find_or_initialize_by(order: 4, body: "weekly")
    sq.survey_answers.find_or_initialize_by(order: 5, body: "once or twice a week")
    sq.survey_answers.find_or_initialize_by(order: 6, body: "daily")
    sq.save!
end
SurveyQuestion.find_or_initialize_by(id_tag: "late-for-school").tap do |sq|
    sq.body = "[Student] is late for school."
    sq.order = 3
    sq.question_type = "single"
    sq.survey_answers.find_or_initialize_by(order: 1, body: "never")
    sq.survey_answers.find_or_initialize_by(order: 2, body: "once or twice a semester")
    sq.survey_answers.find_or_initialize_by(order: 3, body: "monthly")
    sq.survey_answers.find_or_initialize_by(order: 4, body: "weekly")
    sq.survey_answers.find_or_initialize_by(order: 5, body: "once or twice a week")
    sq.survey_answers.find_or_initialize_by(order: 6, body: "daily", resource_list: "School Counselor")
    sq.save!
end
SurveyQuestion.find_or_initialize_by(id_tag: "misses-school").tap do |sq|
    sq.body = "[Student] misses school."
    sq.order = 4
    sq.question_type = "with_follow_up"
    sq.survey_answers.find_or_initialize_by(order: 1, body: "never")
    sq.survey_answers.find_or_initialize_by(order: 2, body: "once or twice a semester")
    sq.survey_answers.find_or_initialize_by(order: 3, body: "monthly")
    sq.survey_answers.find_or_initialize_by(order: 4, body: "weekly")
    sq.survey_answers.find_or_initialize_by(order: 5, body: "once or twice a week")
    sq.survey_answers.find_or_initialize_by(order: 6, body: "daily", resource_list: "School Counselor")
```

```
    sq.save!
  end
  SurveyQuestion.find_or_initialize_by(id_tag: "misses-school-follow-up").tap do |sq|
    sq.body = "[Student] misses school because of [blank]."
    sq.order = 5
    sq.question_type = "multi"
    sq.survey_answers.find_or_initialize_by(order: 1, body: "health reasons",
  resource_list: "School Counselor,School Nurse")
    sq.survey_answers.find_or_initialize_by(order: 2, body: "suspensions / disciplinary
  action", resource_list: "School Counselor,Student Support")
    sq.survey_answers.find_or_initialize_by(order: 3, body: "other", resource_list:
  "School Counselor,Student Support")
    sq.save!
  end
  SurveyQuestion.find_or_initialize_by(id_tag: "misses-school-follow-up2").tap do |sq|
    sq.body = "[Student] [blank]"
    sq.order = 6
    sq.question_type = "single"
    sq.survey_answers.find_or_initialize_by(order: 1, body: "does not act out")
    sq.survey_answers.find_or_initialize_by(order: 2, body: "acts out at home, school, or
  another location")
    sq.survey_answers.find_or_initialize_by(order: 3, body: "has been suspended or
  had behavioral incidents at school")
    sq.save!
  end
  SurveyQuestion.find_or_initialize_by(id_tag: "primary-language").tap do |sq|
    sq.body = "Our first language is [blank]."
    sq.order = 7
    sq.question_type = "single"
    sq.survey_answers.find_or_initialize_by(order: 1, body: "English")
    sq.survey_answers.find_or_initialize_by(order: 2, body: "Spanish")
    sq.survey_answers.find_or_initialize_by(order: 3, body: "Other")
    sq.save!
  end
  SurveyQuestion.find_or_initialize_by(id_tag: "family-meals").tap do |sq|
    sq.body = "Yesterday, our family ate [blank]."
    sq.order = 8
    sq.question_type = "single"
    sq.survey_answers.find_or_initialize_by(order: 1, body: "zero meals")
    sq.survey_answers.find_or_initialize_by(order: 2, body: "one meal")
    sq.survey_answers.find_or_initialize_by(order: 3, body: "two meals")
    sq.survey_answers.find_or_initialize_by(order: 4, body: "three meals")
    sq.survey_answers.find_or_initialize_by(order: 5, body: "more than three meals")
    sq.save!
  end
  SurveyQuestion.find_or_initialize_by(id_tag: "educational-support").tap do |sq|
    sq.body = "[Student] needs extra support in [blank]."
    sq.order = 9
    sq.question_type = "multi"
    sq.survey_answers.find_or_initialize_by(order: 1, body: "Math", resource_list:
  "School Counselor")
    sq.survey_answers.find_or_initialize_by(order: 2, body: "Science", resource_list:
  "School Counselor")
    sq.survey_answers.find_or_initialize_by(order: 3, body: "Foreign Language",
  resource_list: "School Counselor")
    sq.survey_answers.find_or_initialize_by(order: 4, body: "Written Expression",
  resource_list: "School Counselor")
    sq.survey_answers.find_or_initialize_by(order: 5, body: "Enrichment Activities",
  resource_list: "School Counselor")
    sq.survey_answers.find_or_initialize_by(order: 6, body: "College and Career
  Planning", resource_list: "School Counselor")
    sq.survey_answers.find_or_initialize_by(order: 7, body: "ELA; Reading and
  Comprehension", resource_list: "School Counselor")
    sq.save!
  end
  SurveyQuestion.find_or_initialize_by(id_tag: "meta-support").tap do |sq|
    sq.body = "[Student] needs some help with [blank]."
    sq.order = 10
    sq.question_type = "multi"
    sq.survey_answers.find_or_initialize_by(order: 1, body: "Study skills", resource_list:
  "School Counselor")
    sq.survey_answers.find_or_initialize_by(order: 2, body: "Improving School Success
  (Time Mgmt, Study Skills, Organization, Etc)", resource_list: "School Counselor")
    sq.survey_answers.find_or_initialize_by(order: 3, body: "Memory", resource_list:
  "School Counselor")
    sq.survey_answers.find_or_initialize_by(order: 4, body: "Visual and performing
  arts", resource_list: "School Counselor")
    sq.survey_answers.find_or_initialize_by(order: 5, body: "Nutrition/Eating
  Disorder", resource_list: "School Counselor,School Nurse,Student Support")
```

```
    sq.survey_answers.find_or_initialize_by(order: 6, body: "Speech/Verbal
Expression", resource_list: "School Counselor,Student Support,Special Education
Coordinator")
    sq.survey_answers.find_or_initialize_by(order: 7, body: "Listening", resource_list:
"School Counselor,School Nurse,Student Support")
    sq.survey_answers.find_or_initialize_by(order: 8, body: "Homework Assignments",
resource_list: "School Counselor,Student Support")
    sq.survey_answers.find_or_initialize_by(order: 9, body: "Interpersonal Skills
(Communication)", resource_list: "School Counselor,Student Support")
    sq.survey_answers.find_or_initialize_by(order: 10, body: "Peer Interaction",
resource_list: "School Counselor,Student Support")
    sq.survey_answers.find_or_initialize_by(order: 11, body: "Relationship
Development", resource_list: "School Counselor,Student Support")
    sq.survey_answers.find_or_initialize_by(order: 12, body: "Paying
Attention/Hyperactivity", resource_list: "School Counselor,Student Support,Special
Education Coordinator")
    sq.save!
end
SurveyQuestion.find_or_initialize_by(id_tag: "high-risk-behaviors").tap do |sq|
    sq.body = "[Student] shows the following high risk behaviors."
    sq.order = 11
    sq.question_type = "multi"
    sq.survey_answers.find_or_initialize_by(order: 1, body: "Anger Management",
resource_list: "School Counselor,Student Support")
    sq.survey_answers.find_or_initialize_by(order: 2, body: "Homelessness",
resource_list: "School Counselor,Student Support")
    sq.survey_answers.find_or_initialize_by(order: 3, body: "Stress/Anxiety",
resource_list: "School Counselor,Student Support")
    sq.survey_answers.find_or_initialize_by(order: 4, body: "Gang-related Activities",
resource_list: "School Counselor,StudentSupport,Principal")
    sq.survey_answers.find_or_initialize_by(order: 5, body: "Traumatic events (death,
divorce, etc)", resource_list: "School Counselor,Student Support,School
Nurse,Principal")
    sq.save!
end
SurveyQuestion.find_or_initialize_by(id_tag: "family-insurance").tap do |sq|
    sq.body = "My family [blank]."
    sq.order = 12
    sq.question_type = "single"
    sq.survey_answers.find_or_initialize_by(order: 1, body: "has private health
insurance")
    sq.survey_answers.find_or_initialize_by(order: 2, body: "has public health
insurance (TNcare, Medicaid)")
    sq.survey_answers.find_or_initialize_by(order: 3, body: "doesn't have insurance")
    sq.survey_answers.find_or_initialize_by(order: 4, body: "I don't know about our
health insurance")
    sq.save!
end
SurveyQuestion.find_or_initialize_by(id_tag: "family-information").tap do |sq|
    sq.body = "My family would like information about:"
    sq.order = 13
    sq.question_type = "multi"
    sq.survey_answers.find_or_initialize_by(order: 1, body: "Eyecare/glasses")
    sq.survey_answers.find_or_initialize_by(order: 2, body: "Dental Services")
    sq.survey_answers.find_or_initialize_by(order: 3, body: "Tutoring programs &
homework help")
    sq.survey_answers.find_or_initialize_by(order: 4, body: "Enrichment opportunities
(sports, arts, summer camps)")
    sq.survey_answers.find_or_initialize_by(order: 5, body: "Healthcare needs")
    sq.survey_answers.find_or_initialize_by(order: 6, body: "Asthma management")
    sq.survey_answers.find_or_initialize_by(order: 7, body: "Healthy eating/weight
management")
    sq.survey_answers.find_or_initialize_by(order: 8, body: "GED")
    sq.survey_answers.find_or_initialize_by(order: 9, body: "Legal assistance")
    sq.survey_answers.find_or_initialize_by(order: 10, body:
"Food/utility/rental/housing assistance")
    sq.survey_answers.find_or_initialize_by(order: 11, body: "ESL Adult classes")
    sq.survey_answers.find_or_initialize_by(order: 12, body: "Professional mental
health")
    sq.survey_answers.find_or_initialize_by(order: 11, body: "Counseling")
    sq.survey_answers.find_or_initialize_by(order: 12, body: "Employment fairs")
    sq.save!
end
SurveyQuestion.find_or_initialize_by(id_tag: "student-college").tap do |sq|
    sq.body = "[Student] [blank] the first person in our family to attend college."
    sq.order = 14
    sq.question_type = "single"
    sq.survey_answers.find_or_initialize_by(order: 1, body: "will be")
    sq.survey_answers.find_or_initialize_by(order: 2, body: "will not be")
```

```
    sq.save!
end
SurveyQuestion.find_or_initialize_by(id_tag: "parent-student-help").tap do |sq|
    sq.body = "I want to help [Student] [blank]."
    sq.order = 15
    sq.question_type = "multi"
    sq.survey_answers.find_or_initialize_by(order: 1, body: "remember to do [his/her]
homework")
    sq.survey_answers.find_or_initialize_by(order: 2, body: "improve [his/her]
behavior in school, at home, or elsewhere")
    sq.survey_answers.find_or_initialize_by(order: 3, body: "make a post-secondary
plan: a job, GED, college, or community college")
    sq.save!
end
---------------------------------------------
# creates the circle of support using participation in notes or events
def add_to_circle
    students.each do |student|
        if created_by.present?
            if created_by.try(:caregiver).present?
                caregiver = created_by.caregiver
                StudentRole.create(student_id: student.id, provider_caregiver_id: caregiver.id,
role_id: caregiver.role_id, in_school: true)
            else
                StudentRole.create(student_id: student.id, user_id: created_by.id, role_id: nil,
in_school: true)
            end
        end
        providers.each do |provider|
            StudentRole.create(student_id: student.id, provider_id: provider.id, in_school:
false)
        end
        caregivers.each do |caregiver|
            StudentRole.create(student_id: student.id, provider_caregiver_id: caregiver.id,
role_id: caregiver.role_id, in_school: caregiver.network_employee_id.present?)
        end
    end
end
```

At step 318, the processor generates a plot showing the progress along with displaying the raw numbers. The system may generate progress monitors for one or more categories of interventions and may also add new categories of interventions to support holistic student development.

Figure 16:
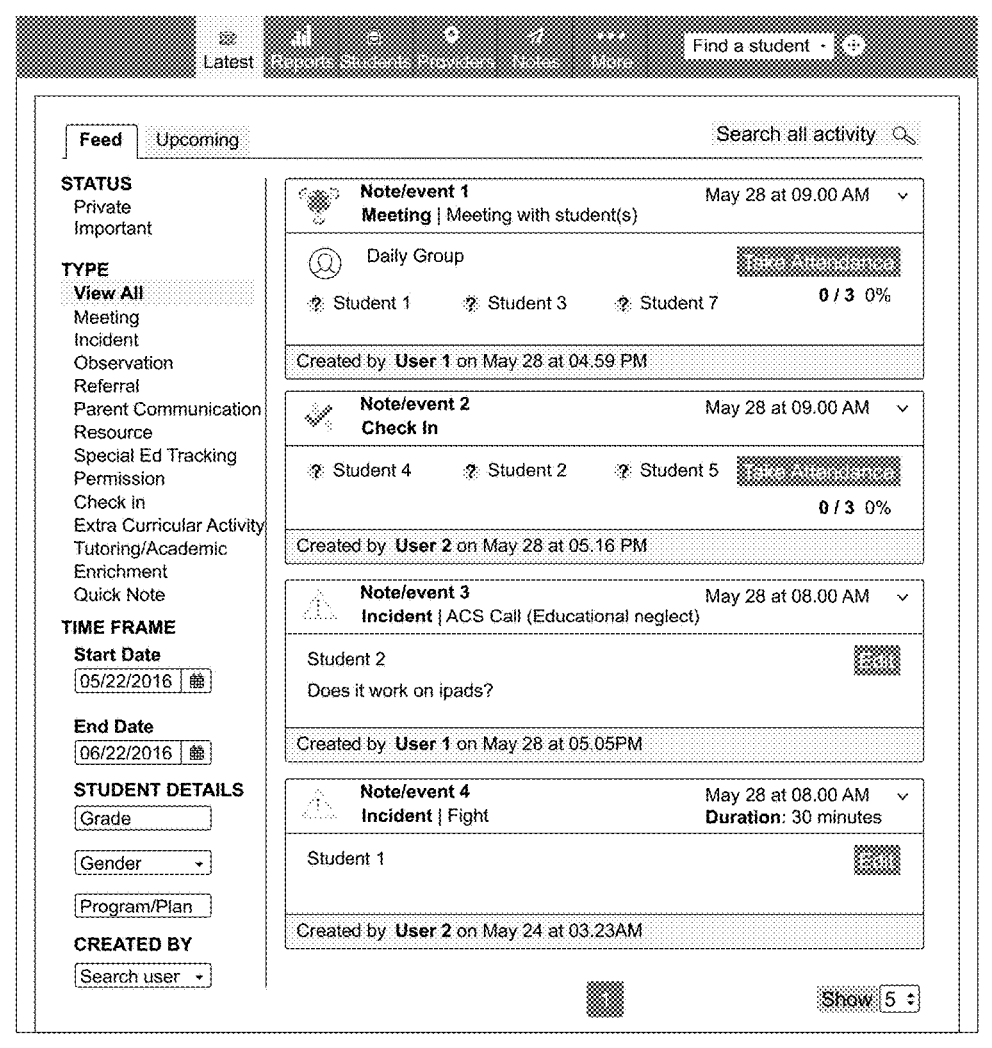
Figure 17:
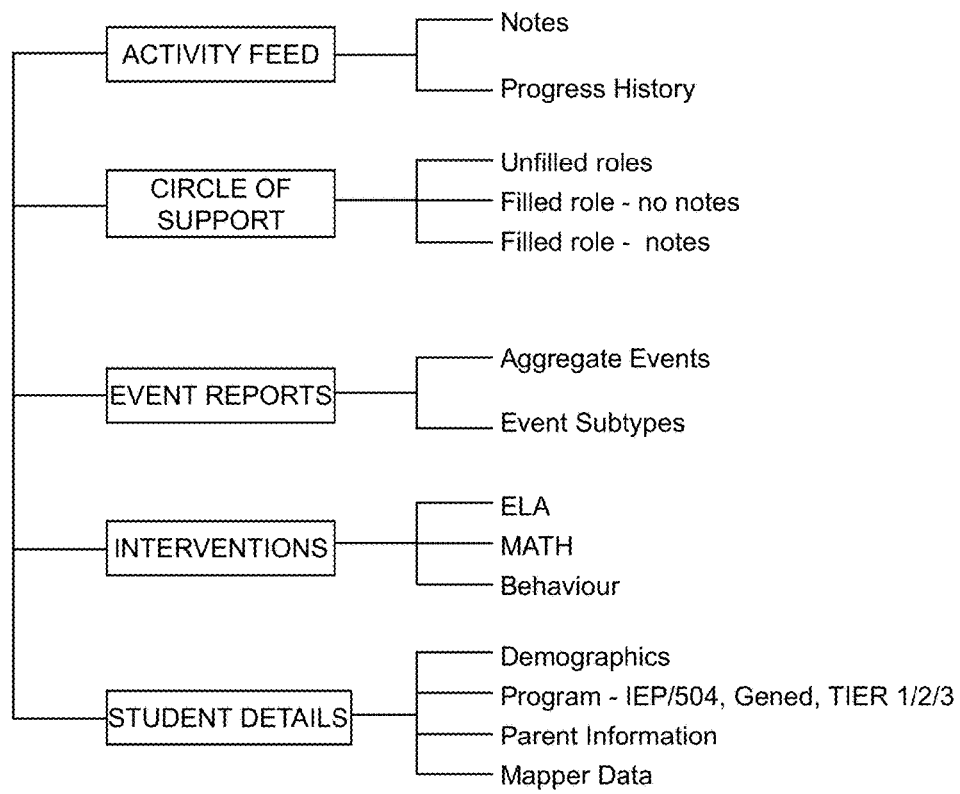
FIG. 17 is a sample data record for a student, generated by the education data platform system of FIG. 1, in accordance with one embodiment of the invention.

In accordance with one embodiment the invention, the system generates a display from single unified data record for each student. The unified single student data record brings together data from across all integrated services, including but not limited to general education, 504, IEP, and in- and out-of-school non-academic services. An exemplary unified single student data record displaying the various integrated services is shown in FIG. 17. The record brings together the activity feed for the student such as in FIG. 16 (which includes a collection of notes, progress history etc.), his/her circle of support such as in FIG. 12 (filled and unfilled roles), various event reports such as in FIGS. 4-7 (which includes a collection of events and event subtypes) and interventions such as in FIG. 13 for that student (which may include English, Math and behavior interventions) as well as details about the student (e.g., demographics, program information, parent information, Needs Mapper information). The system thus provides a complete holistic picture of who the student is. This is an improvement over existing education systems, which do not track data from all categories, and do not provide a way to look at the complete picture of a student. For example, existing systems may deal separately with students with IEPs, 504s, and General Education population, or are in Response to Intervention or multi-tiered systems of support. The system facilitates tracking out-of-school services alongside in-school services and facilitates tracking academic services alongside behavioral or other non-academic services. This allows for data aggregation and analysis of interventions across categories.

The system allows for the recording and reporting of events or activities, which in the embodiment described herein comprise twelve categories of interactions between the students, parents, school personnel, and/or other service providers: Tutoring/Academic Enrichment; Meetings; Resources; Parent Communication; Monitoring/Observations; Special Education Tracking; Check-in/check-outs; Extracurricular Activities; Permissions; Incidents, Referrals, and Quick Notes (uncategorized interactions or notes). Additional or different categories of events may be tracked. Similarly recorded and reported are notes or free text entries such as reminders or events not falling into the established categories. The system of the invention can readily be modified by adding categories as needed by the individual school or school system.

The system provides for reporting time-based views of events, notes, and interventions, and provides visualizations of these reports based on data type and time span. Time charts of events can reveal patterns, trends, and unusual spikes and lulls in event frequencies.

In particular, the system provides student growth visualizations for academic, behavior, and/or social skills development. These visualizations facilitate parent conversations and engagement. Interventionists can use the charts as a visual reference for conversations with parents about intervention progress and the importance of attendance. Parent engagement in, and understanding of, the intervention process is greatly improved by visualizations of the impacts of interventions and attendance on outcomes, both positive and negative. In particular, the interventions are plotted to track progress of increase in good behavior, decrease in bad behavior, and/or stable behavior. These visualizations not only prevent repeated data entry but also empower a parent to support the student at home using the data presented, and promote better attendance by providing clear visualizations of the impact of attendance on performance.

Student growth and outcomes are measured by a number of tools and data platforms, but it has not previously been presented in ways that promote engagement, understanding and empowerment. The system of the invention provides a set of standardized, simple, line graphics (charts) that show student progress over time, aligned or overlaid with the relevant growth plan (e.g., academic, behavior, social, emotional, health or wellness). The line charts plot growth over time and show student progress in a format that is easy to understand and proactively respond to. Growth plans can be custom-developed by student support teams, or can be selected from a set of commonly used benchmarked plans, such as the Dibels ELA (English Language Arts) and Math Basic Competency Skills progress monitoring frameworks.

Figure 5:
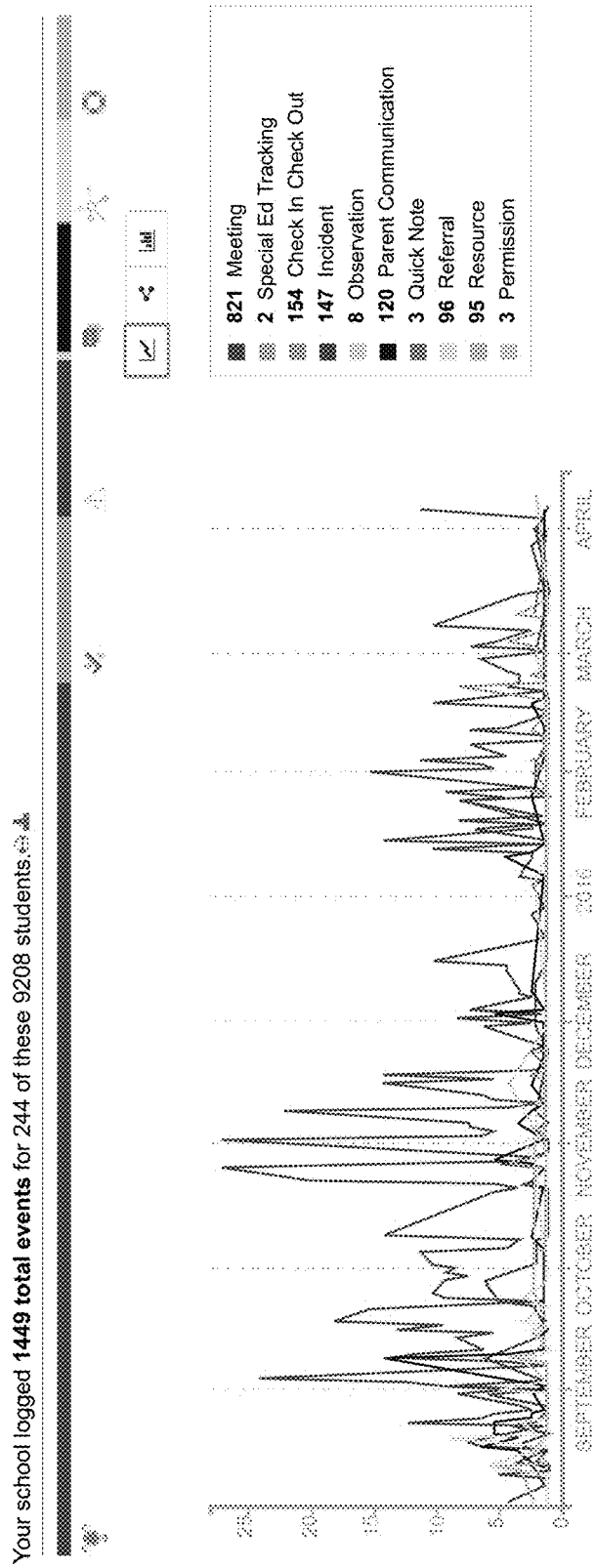
FIG. 5 is an event report with a line plot of activity for a group of students, generated by the education data platform system of FIG. 1, in accordance with one embodiment of the invention.

The system of the invention uses behavioral economics concepts to support holistic, action-oriented reports and to design visualizations, in which non-academic positives are tracked, in addition to the usual academic measures. This permits reports and visualizations to be customized for greater impact on the individual student. The system's default visualization styles are designed based on the optimal presentation for the parsing of information. For example, in FIG. 5, aggregate data for a group of students are shown as line plots to enable identification of trends over time. Color may be used to highlight important information. For example, in FIG. 5, red is used for incidents to reflect the magnitude, date, and students impacted, while meetings and communications are shown in green and blue trend-lines respectively to reflect the larger number of daily activities and their change over time. Different data may be visualized differently, e.g., scatter plots in FIG. 5 show the high frequency of meetings but very little use of resources. FIG. 13 shows an exemplary ELA action plan for a student and visualization of progress monitors with benchmarks. While the default style of each note or event type reflects "smart" default visualization, users have the ability to change the visualization style to alternative formats. By default, the system presents related data in easy-to-compare chart and table formats. For instance, parent communication may be shown as a bar chart because the trend is less important than the timing of communications.

In accordance with one embodiment of the invention, the default style of the tables and charts shows only the top five most-utilized events, rather than the complete list of twelve event types. By reducing the number to the most-used, this default avoids burdening the user with the information overload problem caused when there are too many options to consider. For example, five is a "magic number" according to Warren Weaver's cognitive science and chunking theories. In alternate embodiments, the system may chart more or less than the top five events. According to George Miller's "7 plus or minus 2" concept, for example, seven is a preferred number.

According to one aspect of the disclosure, the education data platform system 100 allows for the creation of a circle of support for the student learner. The circle of support comprises one or more in-school and/or out-of-school caregivers and providers that support a student learner's outcome. In one embodiment, the system enables the creation of a circle of support from over forty in-school and out-of-school support roles, and provides families with consolidated contact information for the relevant in-school personnel and external professionals and service providers. Unlike prior art systems, the circle of support in the system of the invention is driven by the student needs as well as the student experiences, including family needs and experiences, in both academic and non-academic fields. For example, demographic and status indicators such as homelessness, eating disorders, and others as noted above, that are statistically associated with student problems and needs, are taken into account. For instance, if a student uses a tutor, it typically results in better grades. But the system of the invention takes into account a student's experiences as well to recommend the best resource help. For example, if a student plays video games daily and lives in a foster home, in addition to using a tutor, the student may benefit from different resources than just a tutor, e.g. online educational resources, mentor, or recreation center.

The circle of support also includes recommendations for both human and non-human resources. Human resources may be tutors, mentors, physical therapists etc. Examples of non-human resources are online educational resources, video, playlists etc. The non-educational resources are based on real student experiences (e.g., student uses computer) rather than student attributes or interests (e.g., student likes to use computer). This multi-dimensional evaluation and recommendation system enables variable weighting of the elements of the model based on school, family, student, and community factors. The circle of support thus supports academic, behavioral, social, emotional and cognitive development. By creating and tracking follow-up events, such as meetings and scheduled evaluations, the system avoids the problem of students "falling through the cracks" after their individual needs are identified.

According to one aspect of the disclosure, the education data platform system 100 employs a user-based identity and access management ("TAM") for schools, families, and/or related service providers in the system. With TAM, an educator or caregiver in a network of schools can only see his or her specific student caseload within the network. TAM features tiered access to information for each group of users, e.g. parents/families, individual educators, school administrators, district/network administrators and/or community service providers. The system employs separate networks for each school, district, group, or service provider organization. Families have access to their own, personalized view of the platform. Access to student data is based on both statutory and agency regulations, and on user permissions, so that the sharing of data between users happens only in cases where the data custodian grants specific access for uses that support positive student outcomes. The IAM system encrypts all personally identifiable information and uses Secure Sockets Layer (SSL) security to protect student, family and school information. Thus, the system enables a school or school system to provide a single real-time platform for disparate groups of education professionals to track information about student activities, meetings, events, interactions, and interventions. The users have an immediate access to the updated database upon any database updates. The clear tiers of information and access for each type of user enable privacy, security and trust to be maintained while still making available the data and information necessary to support student success. For example, the behavior support provider may not be allowed to access information relating to services provided by other providers not related to behavioral outcomes, private notes by school staff, permission slip and emergency contact information for field trips.

In accordance with one embodiment of the invention, a user may have one of eight levels of access to (or control of) student information, and through those students, access to notes, events and/or activity log. If a user has access to a student's information, they also have access to all notes that the student is included on. The eight levels are:

Educator Access only to students they are assigned to from a single school.

Network Educator Access only to students they are assigned to from all schools in a network.

School Administrator Access to all students at a given school.

Campus Administrator: Access to all students at multiple, but not all, schools within a network.

Network Administrator Access to all students in a given network.

Organization Administrator: Access all students across multiple specific networks.

Super Administrator Access to all students in the system.

Parent and/or guardian Access to all their student-children.

In addition, students themselves may be included in the parent and/or guardian level or as a separate level. Alternately, additional or different levels of access may be created under the system.

Not all users require (or are permitted) access to all types of events, and different events call for different handling by the users. Thus, in accordance with another aspect of the disclosure, the system of the invention provides individual APIs for each type of event. The use of individual APIs makes the system modular and enables the aggregation and disaggregation of interventions and interactions across categories, and provides all users with the information and tools that they need.

The system also makes time tracking for Special Education Individualized Education Programs (IEPs) easy, via a time tracking application that enables educators and service providers to track the time, date and duration of every instance of meeting, tutoring, and intervention aligned with the IEP goals. The tool may be provided online and/or as a mobile application, and facilitates tracking time by student, group, and service. The reports show actionable data at every level, and downloads are provided in various formats as needed for compliance and reporting platforms.

Figure 14A:
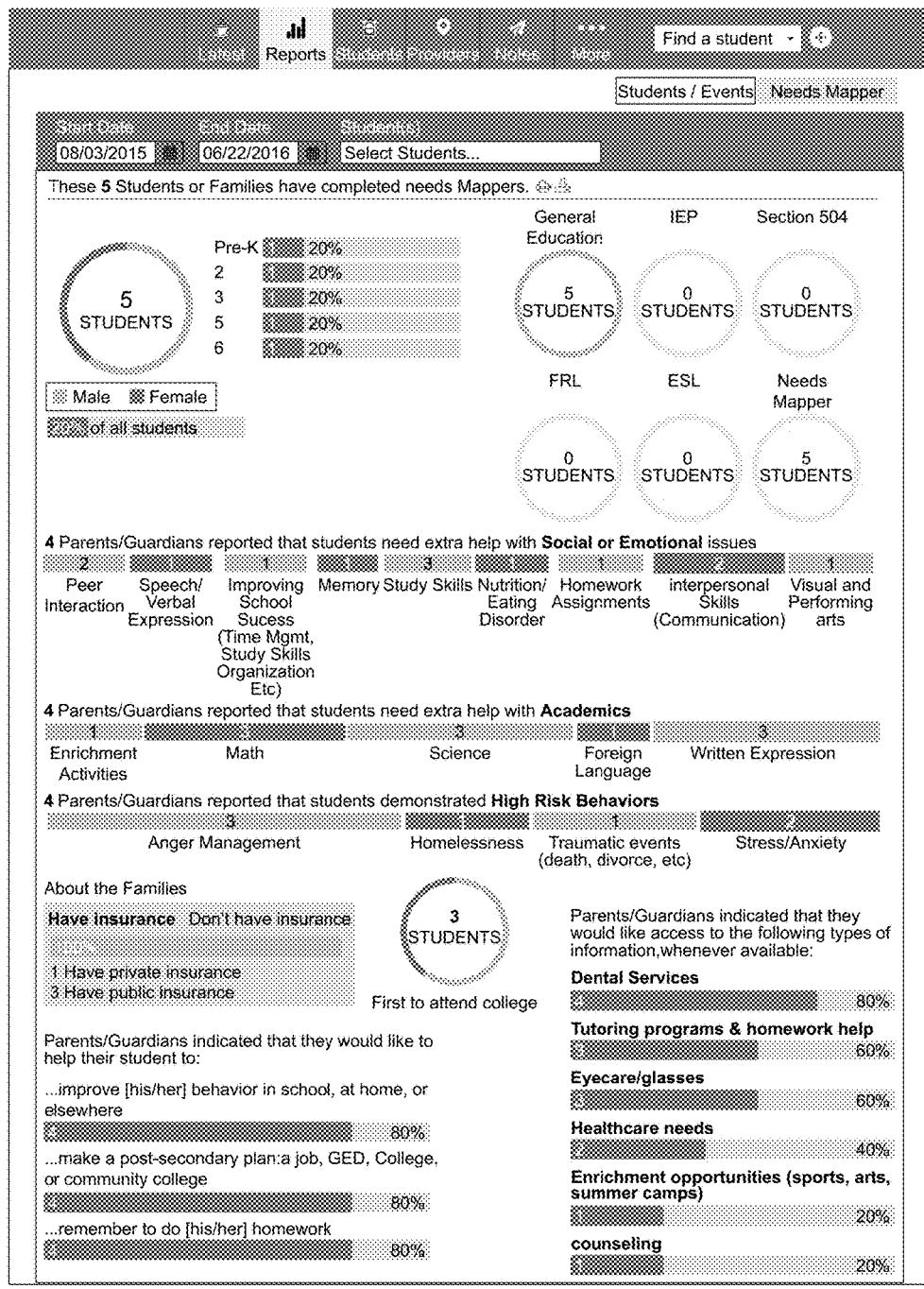
FIGS. 14A-14B present a sample Needs Mapper Report generated by the education data platform system of FIG. 1, in accordance with one embodiment of the invention.
Figure 14B:
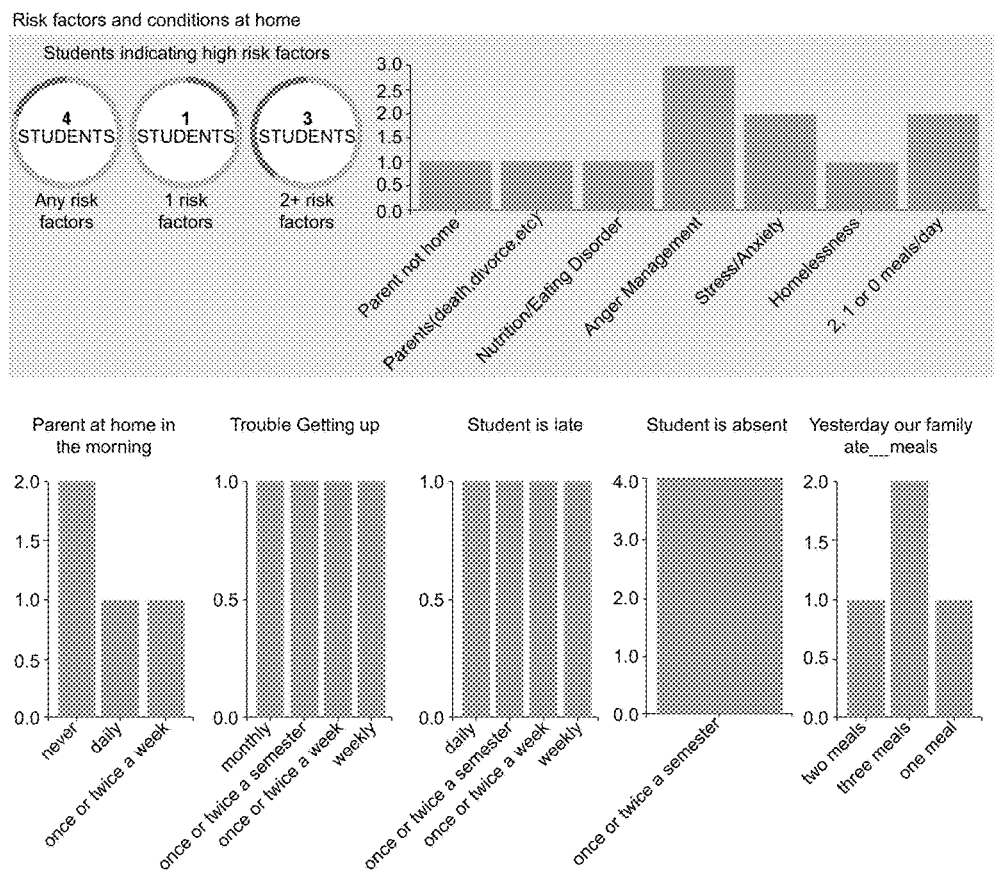

The system also provides a Needs Mapper tool, which, combined with a service provider database, enables parents/families, schools, districts, and service providers to have better access to information about locally available social services. In accordance with another aspect of the disclosure, the education data platform system 100 provides a Needs Mapper tool to gather valuable information about student and family needs for social, emotional, academic, behavior, health and wellness services. The Needs Mapper tool is implemented by the processor and the responses are stored in the database. The Needs Mapper tool may, for example, take the form of a questionnaire or survey for parents, students and/or family that helps to assess a student's needs. The survey may be taken on paper and responses fed into the system to create a Needs Mapper Report, for example, as shown in FIGS. 14A-B. Alternately, the survey may be taken digitally within the system. The tool provides aggregated information about possible services or interventions needed to help the student, and the system uses the information and the multi-factor algorithm to compile a service provider list. This list may be for the school, network, or region and provides coverage across one or more indexed service categories. In one embodiment of the invention, the list spans across more than forty indexed service categories. These listings may be expanded or contracted based on requests from the school, district, or region. The Needs Mapper tool identifies academic, behavioral, social, emotional, and medical needs based upon a variety of criteria, including but not limited to the student's academic performance, certain events (such as incidents, observations, and notes), and questionnaire responses. For example, responses indicating academic aptitude or interest can trigger specific recommendations for extra-curricular activities and enrichment programs.

Figure 12:
FIG. 12 presents a sample circle of support for a high-risk student with special needs, in accordance with one embodiment of the invention.

Responses known to be statistically or empirically associated with specific needs ("high-risk responses") trigger the appropriate recommendations for interventions within the Needs Mapper. By way of example, an indication that the student is dealing with any of the following factors is deemed a high-risk response: parent not at home daily when child leaves for school; high risk behaviors; stress/anxiety; traumatic events (e.g., death or arrest of a family member); gang-related activities; homelessness; eating disorders; trouble getting up daily; anger management issues; and receiving fewer than three meals daily. A student dealing with one or more of these factors will be recommended for an intervention by a guidance counselor, and the addition of specific appropriate roles to the circle of support will be recommended by the system. For example, circle of support members may include support roles such as tutors, mentors, advisors, family counselors, after-school recreational support (if a student is homeless or involved in gangs), etc. FIG. 12 shows an exemplary circle of support for a high-risk student having special needs. It shows the in-school support roles such as teacher, the out-of-school support roles such as tutor as well as recommended support roles for the future to be filled, such as social worker. For each role, it also shows the number of notes and the order of notes. For example, a special education coordinator in school has one note, the tutor has 26 notes while a family health clinic physician shows no notes indicating there was no interaction with the student.

The 1990 federal Individuals with Disabilities Education Act ("IDEA", Public Law No. 94-142) requires that public schools create an individualized education plan (IEP) for every child receiving special education services. Thirteen specific types of disability are recognized as qualifying a student for an IEP. Students not qualifying for an IEP may nonetheless qualify for protection under Section 504 of the Rehabilitation Act of 1973 (Public Law 93-112), a federal civil rights law that prohibits discrimination against public school students with disabilities, including learning and attention issues such as ADHD. These students, too, must meet certain criteria. Disabilities and impairments recognized under IDEA and Section 504 are specifically recognized and dealt with by the system of the invention, from behaviors and observations triggering a professional evaluation, through the recommendation of approved providers of the appropriately recognized services and treatments, and the monitoring of the student's progress and response to the intervention. Information and documentation needed to meet government-mandated reporting requirements is collected and stored by the system, can be updated as needed, and can be reported out in the required formats by the appropriate users.

The system supports interventions by enabling parents, families, students, and/or custodial guardians to provide consent or permission for activities, treatments or services. The system encompasses permission slips and consent forms for field trips, in-school and after-school activities, access to digital resources, and the services of outside providers. The permission slip application is delivered in flexible formats, which are web-based and based on e-signatures where possible, but the system is designed to accommodate any legally or administratively-required media. This aspect of the system is thus available via the web-based platform, via mobile apps for Android™ and Apple™ phones and tablets, and, where necessary, via downloadable forms for generation of paper documents and signatures. SMS text messaging is used for notifications and reminders, and in some circumstances SMS is employed as an appropriate format for granting permission or consent. Parents and families are able to access an online repository of all consents and permissions requested, granted, and denied for the student. Information about data usage, access, and privacy are included in the application, so that a parent or family in the process of providing permission is also engaged in learning about the data implications of participating in the activities.

Figure 4:
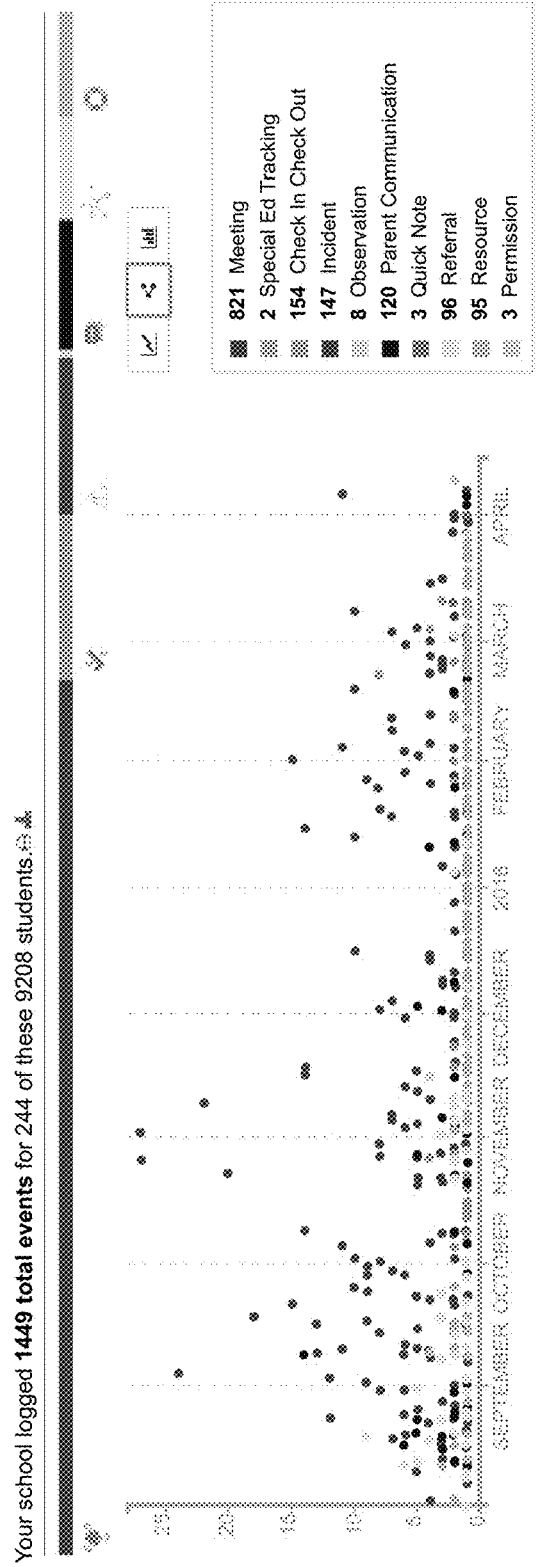
FIG. 4 is an event report with a scatter plot of activity for a group of students, generated by the education data platform system of FIG. 1, in accordance with one embodiment of the invention.

FIG. 4 shows an event report which is a time plot of all events related to a group of students for an academic year, in scatter plot format, as presented by the system in a browser window. The data points may be color-coded by event to enable differentiation by the user. The three buttons above the color coding key toggle between the illustrated scatter plot and alternative bar chart and line chart formats of the same data. The events may be plotted for any period of time for a single student or a group of students. Buttons along the top of the display permit selection of specific events for independent display and "drilling down" into the underlying, un-aggregated data. The system also displays the raw data of the events.

FIG. 5 shows the same information as FIG. 4 but in a line chart format to show trends over time in various events. In one embodiment of the system, the line chart is the default display format.

Figure 6:
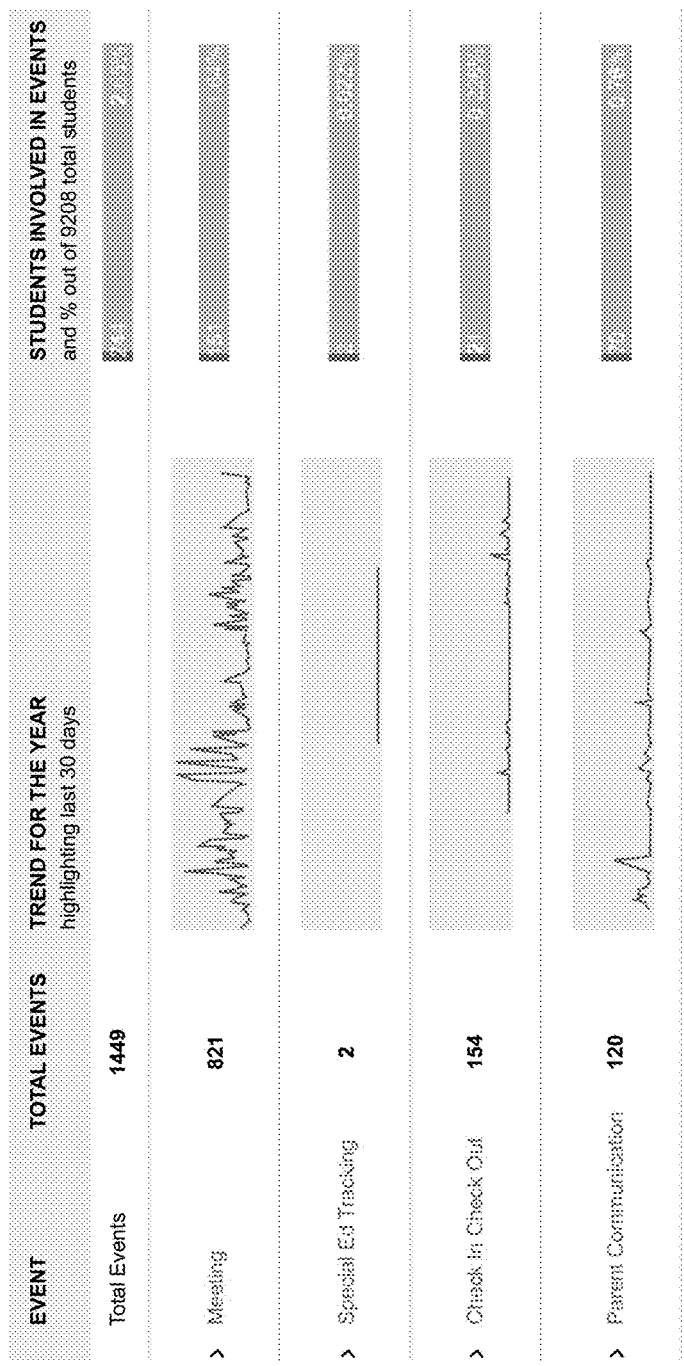
FIG. 6 presents an event report with line charts of activity summaries for a representative school, generated by the education data platform system of FIG. 1, in accordance with one embodiment of the invention.

FIG. 6 shows the same data of FIG. 4 but with the "Meetings", "Special Ed Tracking", "Check In Check Out" and "Parent Communication" event subtypes selected for independent display. These aligned displays help an administrator to identify patterns, such as the cluster of weekly meetings in November and the relative absence of meetings in January. Such patterns may merely reflect reporting deadlines, but they might also indicate inefficiencies. The numbers of students involved in each type of event is displayed at the right; in the example provided, these figures inform an administrator that only 1.64% all students were associated with meetings during that academic year.

Figure 7:
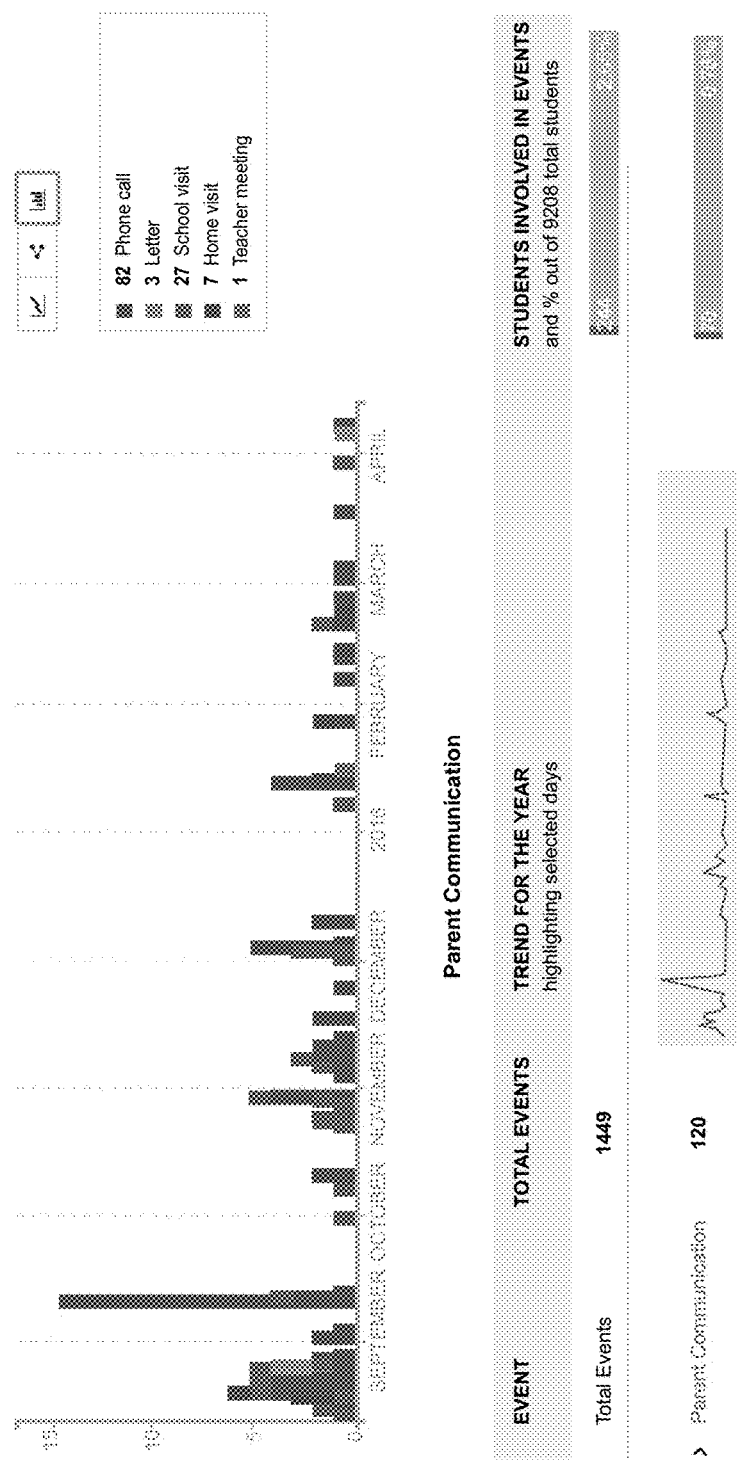
FIG. 7 presents an event report with a bar chart plot of event subtypes for a group of students, generated by the education data platform system of FIG. 1, in accordance with one embodiment of the invention.

FIG. 7 shows an event report further drilling down into the "Parent Communications" event subtype, where sub-subtypes of communication are displayed by the system in a bar chart format. The sub-subtypes may be color-coded for ready identification in the chart. The bulk of communications are seen to be phone calls, with only a single parent-teacher meeting for the entire school year. If the administrator regards this as anomalous, he or she can inspect the records for each individual call to learn whether there is an over-reliance on using telephone conversations to deal with substantive issues. If the school or district has formal or informal goals for meetings with parents, the information in this display might suggest that an administrative action is needed.

Figure 8:
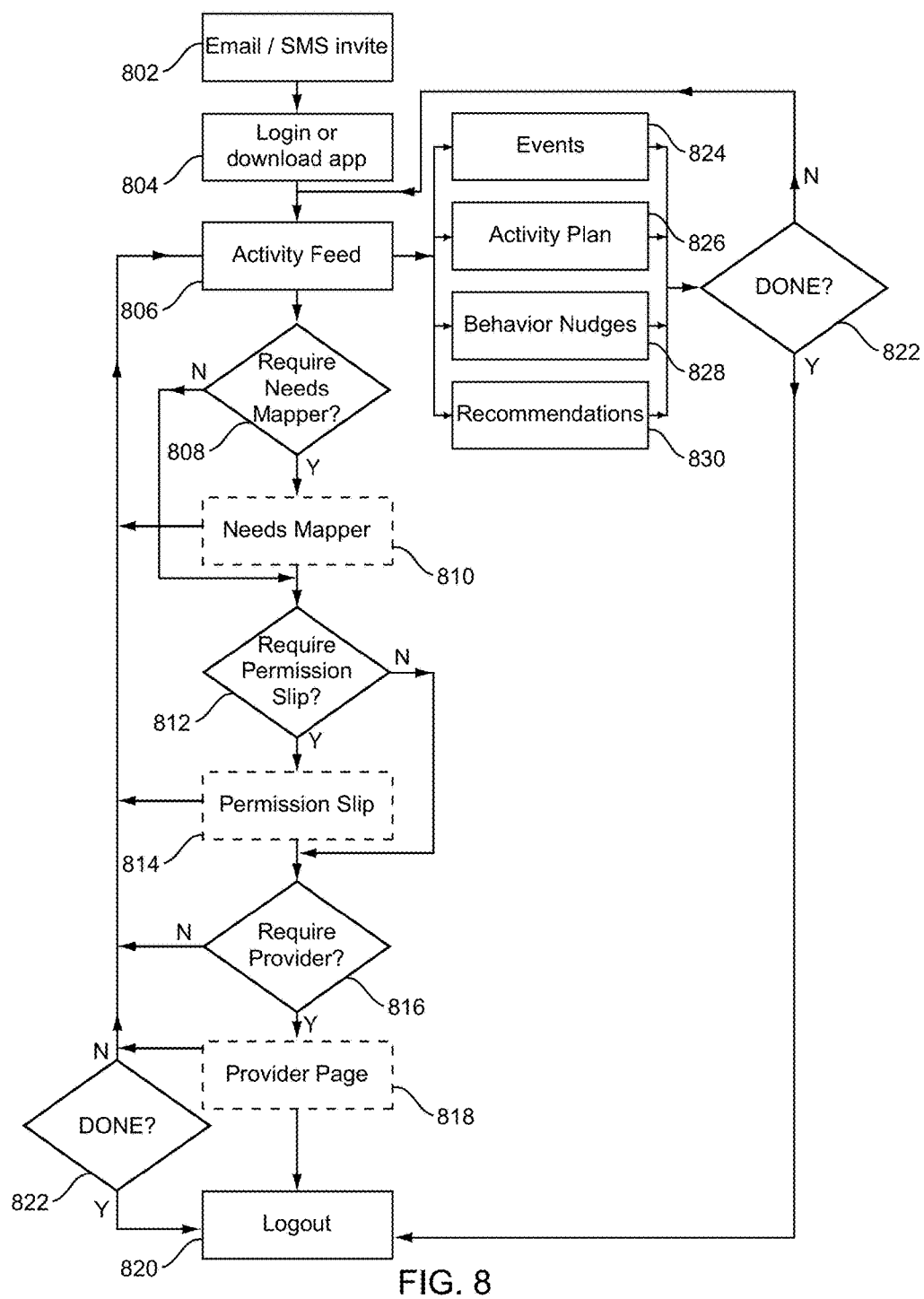
FIG. 8 is a flow chart of the steps followed by a parent when using the education data platform system of FIG. 1, in accordance with one embodiment of the invention.

FIG. 8 is a flow chart of the steps followed by a parent user when using the education data platform system of FIG. 1, in accordance with one embodiment of the invention. The parent receives an email or SMS invitation or notification at step 802, launches a browser or mobile app and logs into the system at step 804 with a password and/or stored credentials. The parent then receives an Activity Feed at step 806, where notices, alerts, and recent activities are presented. If there is an event or notice requiring access to the Needs Mapper, the parent may elect at step 808 to launch the Needs Mapper API at step 810. If there is an upcoming event or intervention requiring a permission slip, the parent may elect at step 812 to launch the permission slip API at step 814, and either grant or deny permission(s) via the appropriate medium (e.g., via SMS, and on-line indication, or a printed form.) At step 816, if there is any other need for provider information indicated in the activity feed, the parent proceeds to the Provider/Field Trip location page at step 818; otherwise the parent may log out at step 820 to terminate the session. After accessing the Provider/Field Trip location page, the parent may log out at step 820 or go back to Activity Feed 806. The parent may access the Needs Mapper, Permission Slip and/or Provider pages directly from the Activity Feed, sequentially (as shown in this embodiment), or in any other order. Activity Feed may present notifications about events/notes entered by the school at step 824, action plans at step 826, suggested "behavioral nudges" at step 828 or other provider recommendations at step 830; each of which may be accessed via the API and viewed by the parent, either sequentially or directly from the Activity Feed or in any other order. If there are no more notifications to be viewed at step 822 the parent may log out at step 820 and end the session; or the parent may return to the activity feed at step 806 to attend to other notifications.

Figure 9:
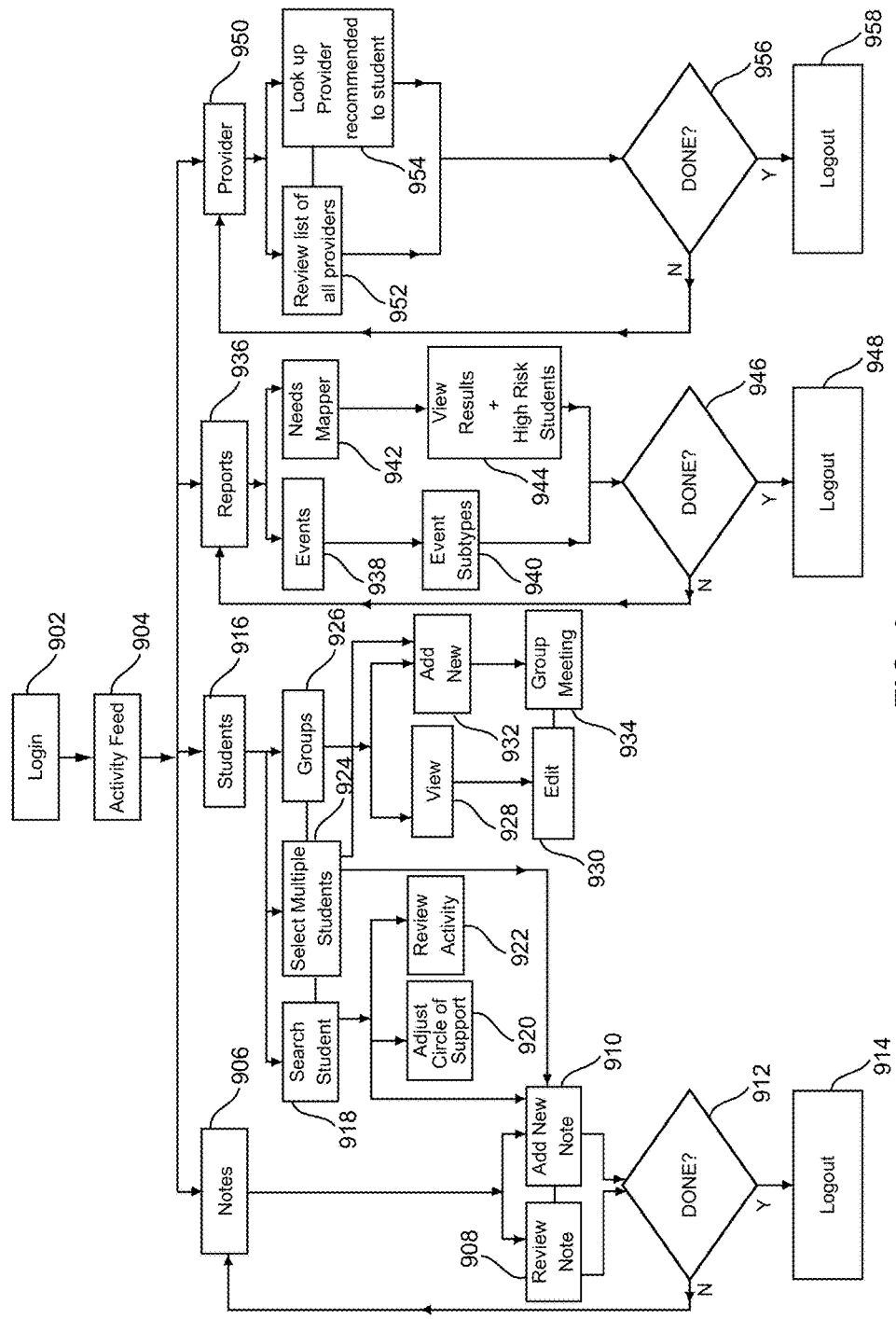
FIG. 9 is a flow chart of the steps followed by a provider when using the education data platform system of FIG. 1, in accordance with one embodiment of the invention.
Figure 15:
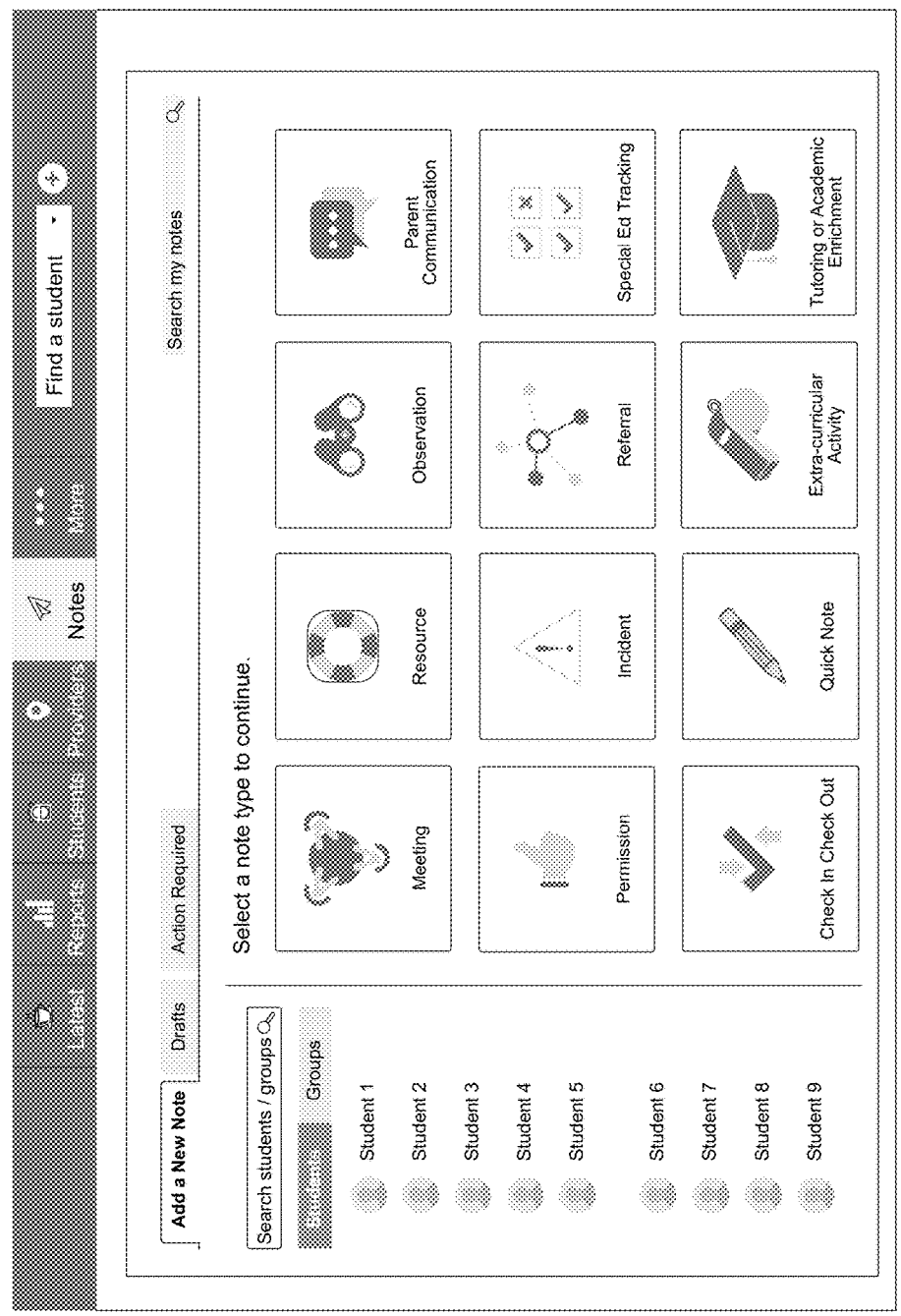
FIG. 15 is a sample Notes API page generated by the education data platform system of FIG. 1, in accordance with one embodiment of the invention.

FIG. 9 is a flow chart of the steps followed by a provider user when using the education data platform system of FIG. 1, in accordance with one embodiment of the invention. The provider logs in at step 902 on his or her own initiative, or in response to an invitation, and is presented with an activity feed at step 904. The provider may review all notes in the feed at step 906 and then log out (not shown) or return to the activity feed for further actions. A sample activity feed page or screen is shown in FIG. 16. At any point, the provider has the option of backing up to the previous step, or logging out. Access to the various APIs from this point is subject to (and conditioned upon) the privileges and permissions conferred upon the provider. The provider may launch a Notes API at step 906 and review notes at step 908 or create new notes for one or more students or groups at step 910. A sample Notes API page or screen is shown in FIG. 15. Each event in the Notes API has its own individual API and all the individual APIs are all in the same format allowing them to be interoperable. The provider may also launch a Reports API at step 936, from which Events can be viewed at step 938, and if desired, the provider can drill down to event subtypes at step 940. From the Reports API, the provider can also access the Needs Mapper Report at step 942 to view results and high-risk students at step 944 and if finished, log out at step 948 or return to the Reports API for further actions. In all of these Reports-associated pages, the provider may view information for one or more students or groups.

The provider may proceed from the activity feed directly to the students API at step 916, from which point there are options to search or select individual students at step 918, select multiple students at step 924, or select one or more existing groups at step 926. Having selected an individual student, the provider may adjust the circle of support, e.g., add or remove a caregiver at step 920, add notes at step 910, and review the student's activity history at step 922. Having selected multiple students, the provider may combine them into a new group at step 932 or create a note for all of the selected students; this note will appear when any of the selected students' information is viewed by other users.

Groups may be defined by the provider in any desired manner (e.g. all of a particular grade, all Section 504 students, etc.) If the provider has elected to view groups at step 926, the membership data and historical activity and events data for the entire group may be viewed at step 928 and edited at step 930. The provider may also create new groups at step 932 and populate them with students, and schedule individual or recurring group meetings at step 934 for new and existing groups and if finished, log out or return to Student API at step 916 for further activity (not shown).

Figure 10:
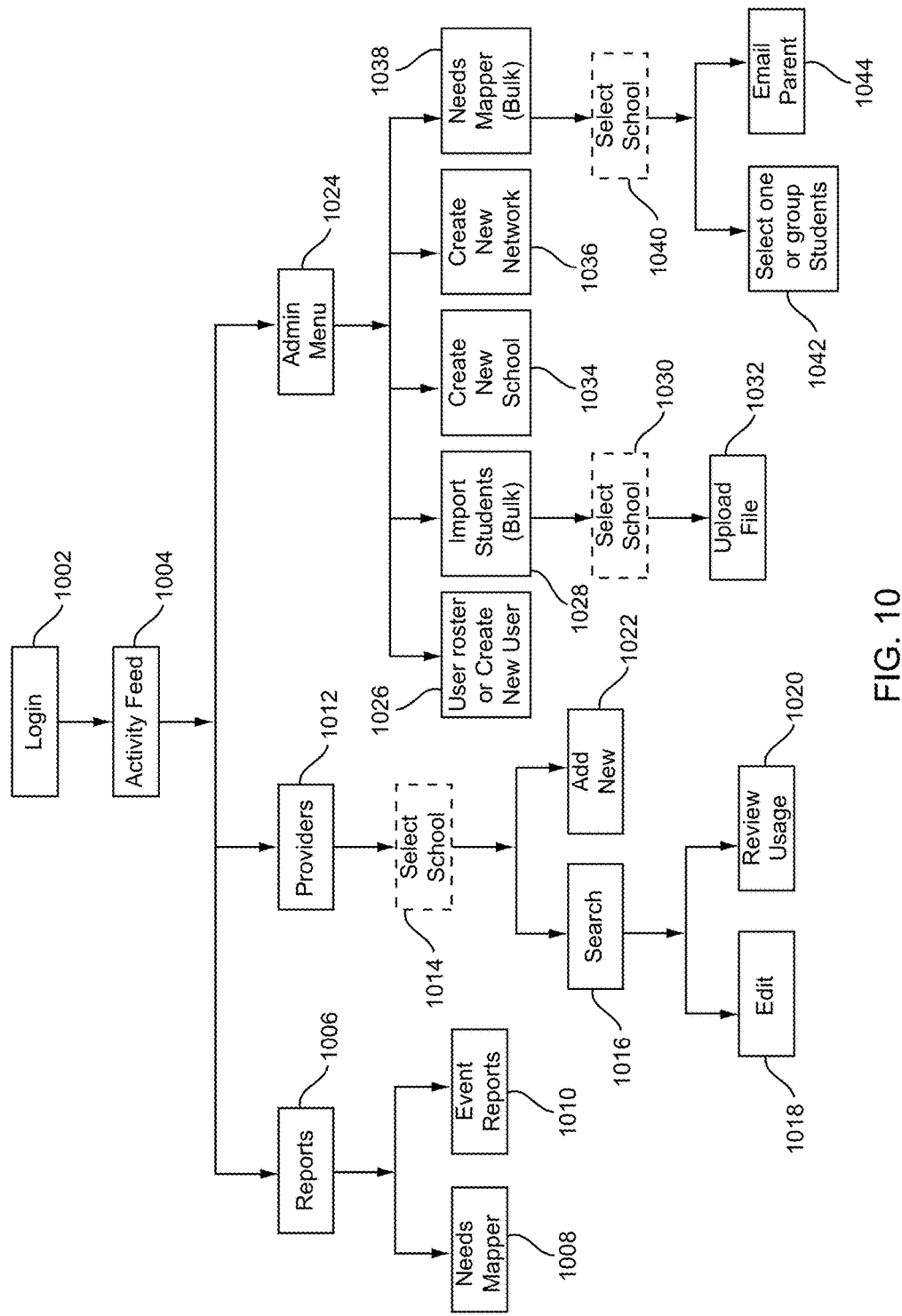
FIG. 10 is a flow chart of the steps followed by a system administrator when using the education data platform system of FIG. 1, in accordance with one embodiment of the invention.

FIG. 10 is a flow chart of the steps followed by a system administrator when using the education data platform system of FIG. 1, in accordance with one embodiment of the invention. The administrator has the option of backing up to the previous page/step or logging out. The administrator logs in at step 1002, and is presented with an option at step 1004 to view school Reports, view Providers, or view an Administrator's Menu. The administrator may then proceed to the Reports API at step 1006 for the selected school, and then either to specific event reports at step 1010 or to the Needs Mapper Report at step 1008 for students at that school. The system administrator has access to only some student data. Alternatively, the system administrator can proceed to the Providers API at step 1012, select a specific school at step 1014 where new providers can be added at step 1022, and the specific providers searched for at step 1016 and the relevant records edited at step 1018 or the provider usage reviewed at step 1020. The administrator can search for providers without selecting a school. A user may set a school and the system centers the providers on that school location. Users at school level and below see the results centered around their school.

Figure 19:
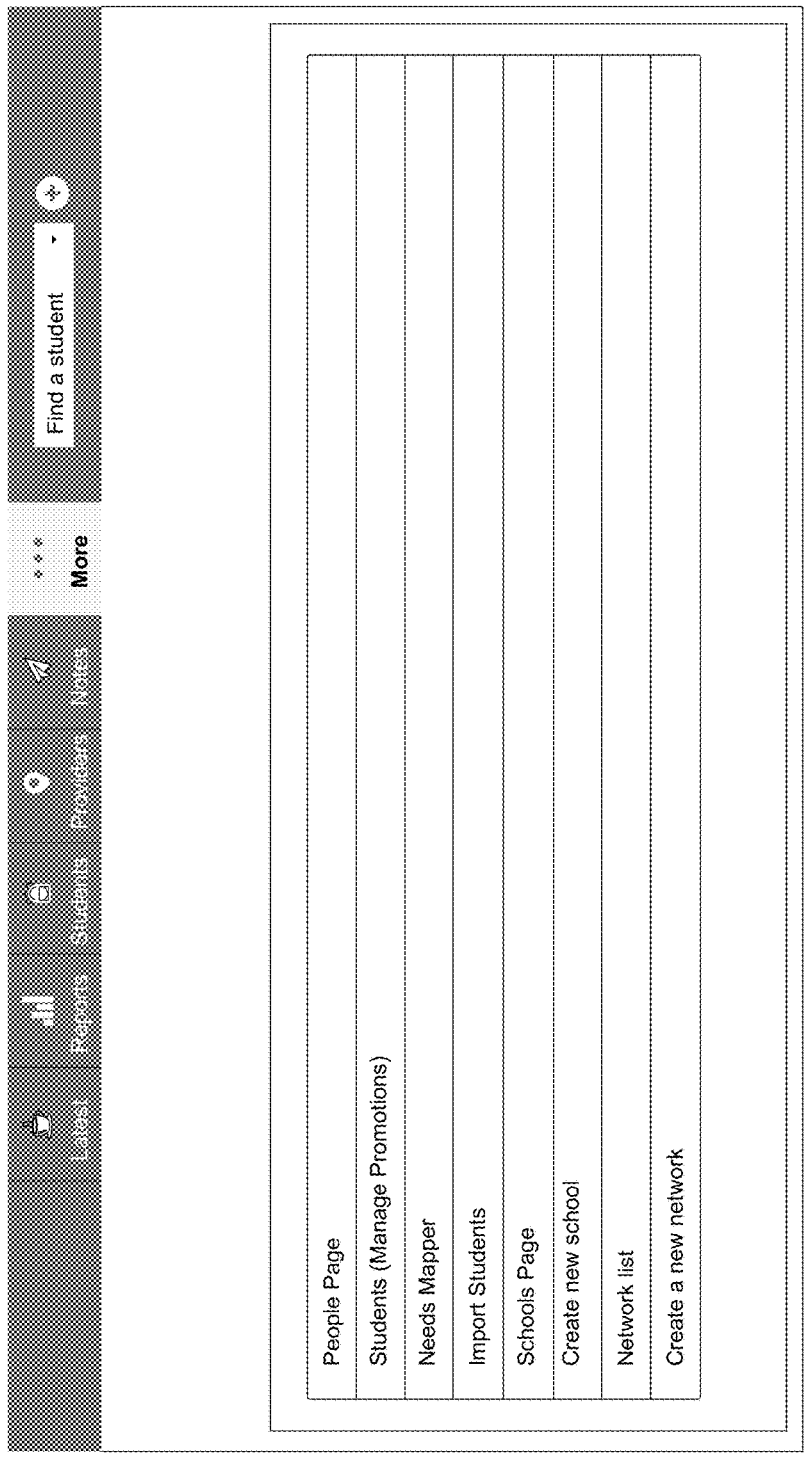
FIG. 19 is an administrator's menu, in accordance with one embodiment of the invention.

Uniquely, the administrator has access to the Administrator's Menu as shown, e.g., in FIG. 19, at step 1024, an API through which selections can be made to edit or create new users ("people's page" in FIG. 19) at step 1026, create new students or import new students in bulk at step 1028, edit or create new schools at step 1034 and networks at step 1036, and create or import Needs Mapper information at step 1038 (See FIGS. 14A-14B). The system administrator may select a specific school at step 1030 before uploading the student files at step 1032 or directly upload the files. Similarly, the administrator may select a specific school at step 1040 before emailing the Needs Mapper to parent at step 1044 or selecting specific student or students from the school at step 1042. The administrator may take other batch actions for the Needs Mapper, e.g. launch the data entry application for use in a school environment. The administrator's menu at step 1024 may be accessed anytime and without selecting a school.

Figure 11A:
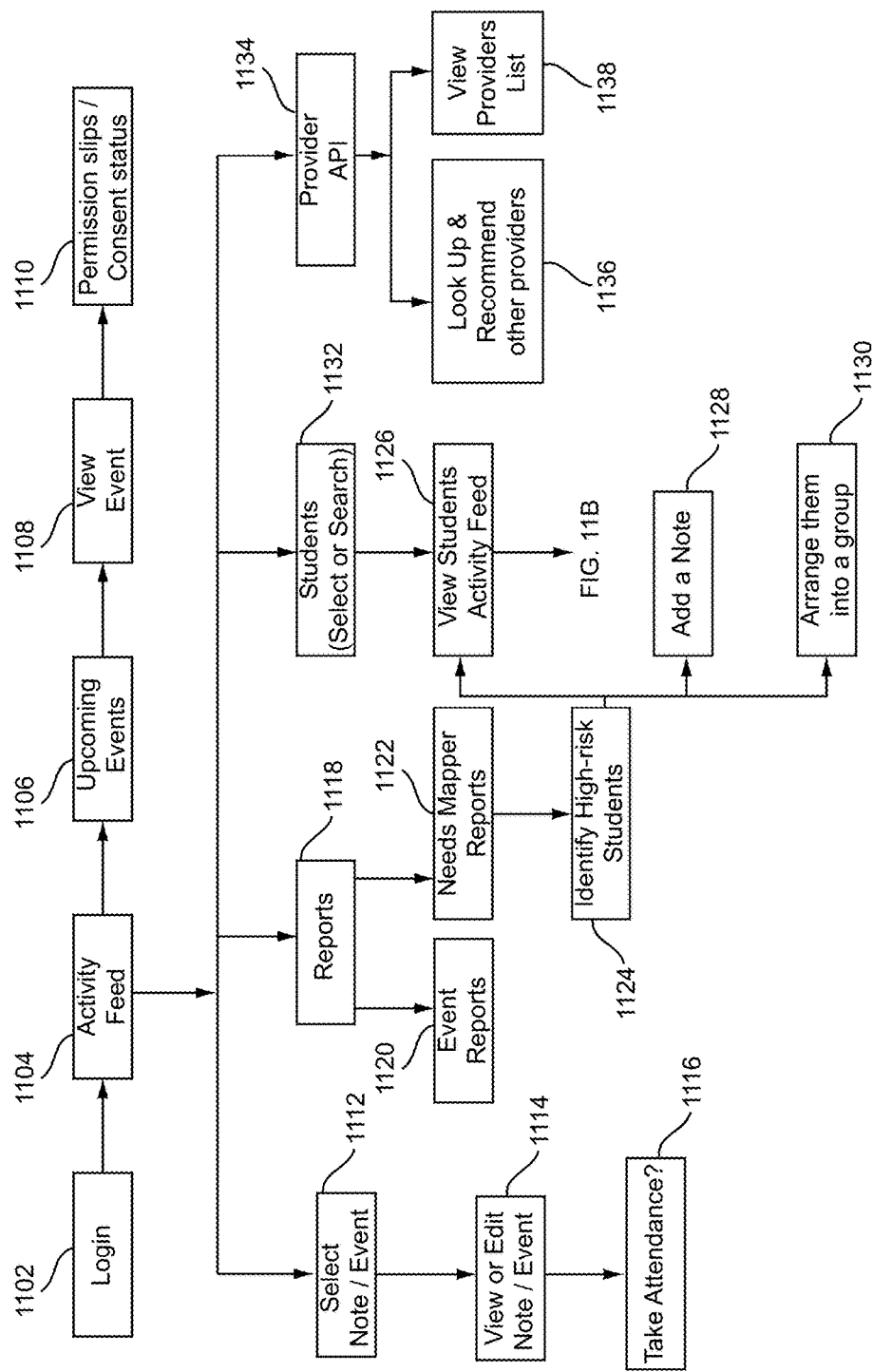
FIGS. 11A-11C are flow charts of the steps followed by a school administrator when using the education data platform system of FIG. 1, in accordance with one embodiment of the invention.
Figure 11B:
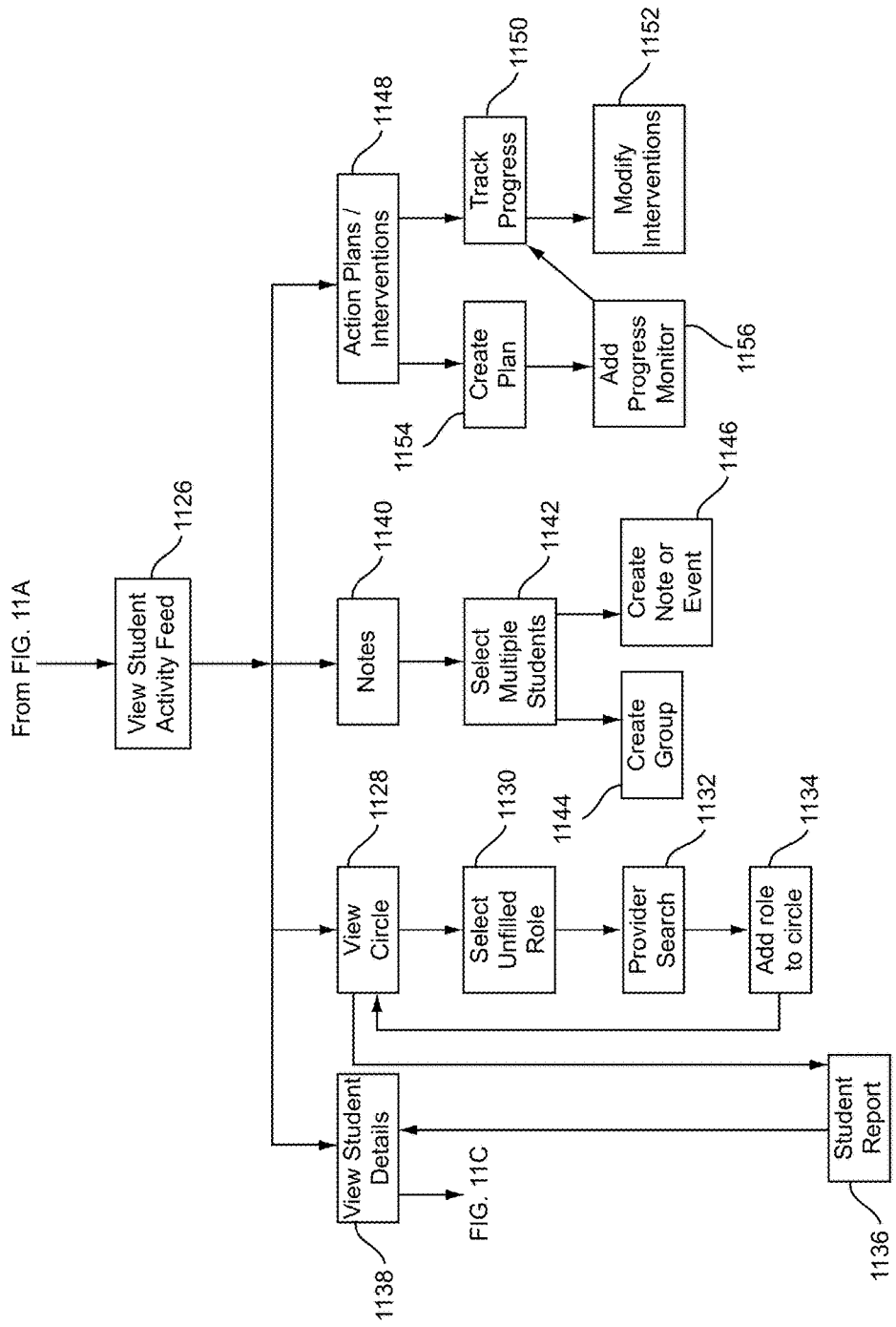
Figure 11C:
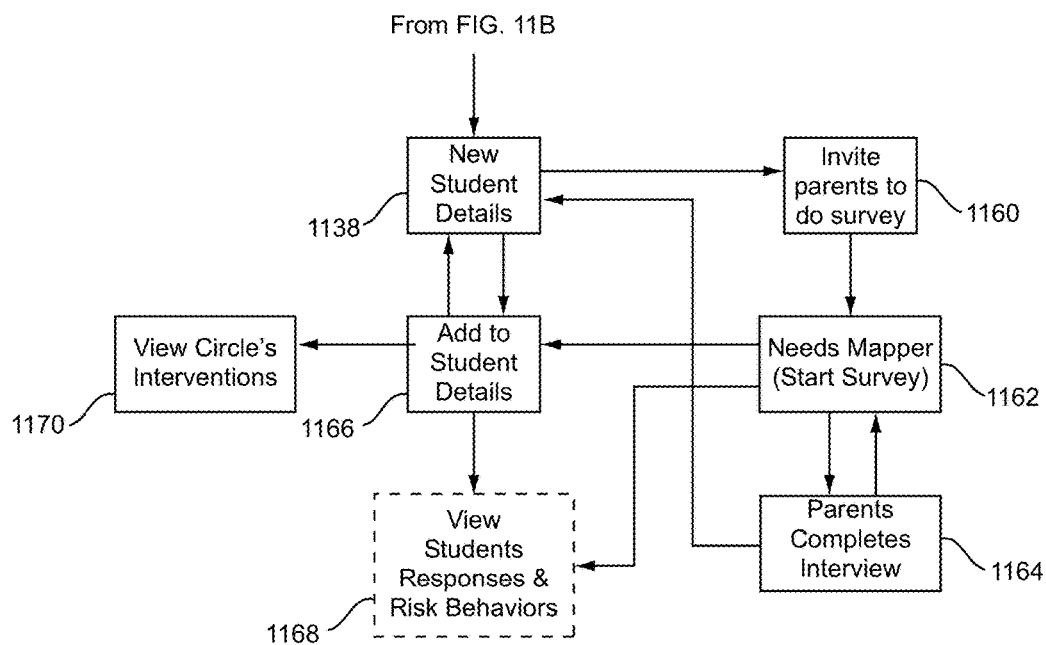

FIGS. 11A-11C present a flow chart of the steps followed by a school administrator when using the education data platform system of FIG. 1, in accordance with one embodiment of the invention. As with other users, at all steps the school administrator has the option of backing up to the previous step or logging out.

FIG. 11A shows the login at step 1102, from which point the Activity Feed is displayed at step 1104. The administrator may view upcoming events at step 1106, and view the details of selected events at step 1108. At step 1110, the status of any parental consent or permission slips for the event can be reviewed as well as the number of consents received. From the activity feed at step 1104, the administrator may also proceed by selecting a note or event at step 1112, which can be viewed or edited at step 1114 and optionally taking attendance information at step 1116. The attendance information may include whether a student is present or absent and optionally his mood and/or reason for absence. Alternately, if the note does not have the "take attendance" feature, the administrator can edit any other field such as time, duration, providers present, attachments etc.

Alternatively, the administrator can view Reports at step 1118, and view specific event subtype reports at step 1120 or Reports from Needs Mapper at step 1122. The administrator can identify "high risk" students at step 1124. Alternatively, the administrator can proceed from Activity Feed at step 1104 by selecting or searching for specific students at step 1132. After student selection or identification via steps 1132 or 1124, the administrator can add a note at step 1128 or arrange them into a group at 1130 or view the student's activity feed at step 1126. Further steps after viewing student activity feed are shown in FIG. 11B, described below.

From Activity Feed at step 1104, the administrator can also access the Providers API at step 1134. The administrator may view the list of providers at step 1138 or look up and recommend other providers at step 1136.

FIG. 11B shows further options available from Student Activity Feed at step 1126. The school administrator may access the View Circle API at step 1128, Notes API at step 1140, Intervention API at step 1148 or Student Details API at step 1138. From the Notes API at step 1140, the administrator may select multiple students at step 1142, and create from the selection a new group at step 1144. At step 1146, new notes or events can be created for the selected students or group. The Student Activity Feed at step 1126 pulls together events, progress monitoring and status updates.

The administrator may select the Action Plans/Interventions API at step 1148 and create plans and interventions at step 1154, for which progress monitors can be added at step 1156. Student progress with the plan or intervention along with progress monitors can be tracked at step 1150, and if the administrator wishes, modifications can be made at step 1152. The administrator may select the View Circle API at step 1128, which permits a review of a student's circle of support. If the administrator determines that the circle should be expanded, an unfilled role is selected at step 1130, and a search for qualified and appropriate providers (stored in the database) is queried at step 1132. The selected role and provider is then added to the student's circle at step 1134. Returning to the View Circle API, the administrator can access Student Report at step 1136 to view the student's activities at step 1126. Student Report is a student level view of the activity/event summary chart. The event subtype report for a single student is available, for example, on clicking through any of the subtypes below the chart. The administrator may directly select the View Details API at step 1138 from the Activity feed. Further steps from View Student Details API are shown in FIG. 11C.

FIG. 11C presents the role of the Needs Mapper. When the administrator elects to add a new role to a student's circle of support at step 1134, the View Student Details API at step 1138 includes a link to an invitation to the parents to do a survey at step 1160 if the student has no Needs Mapper. The Needs Mapper API at step 1162 is used to initiate a Needs Mapper survey, which generates an interview that the parents can complete on line at step 1164. The results of the interview are incorporated into the Student Details at step 1166. The Needs Mapper also optionally enables viewing the student's responses and risk behaviors at step 1168. These may be gathered in text format in the student detail section of each student or as visualization in the Reports. Informed by the details provided in the parents' interview, the administrator can review the interventions at step 1170, and create, track, and modify them as shown in FIG. 11B.

Figure 18:
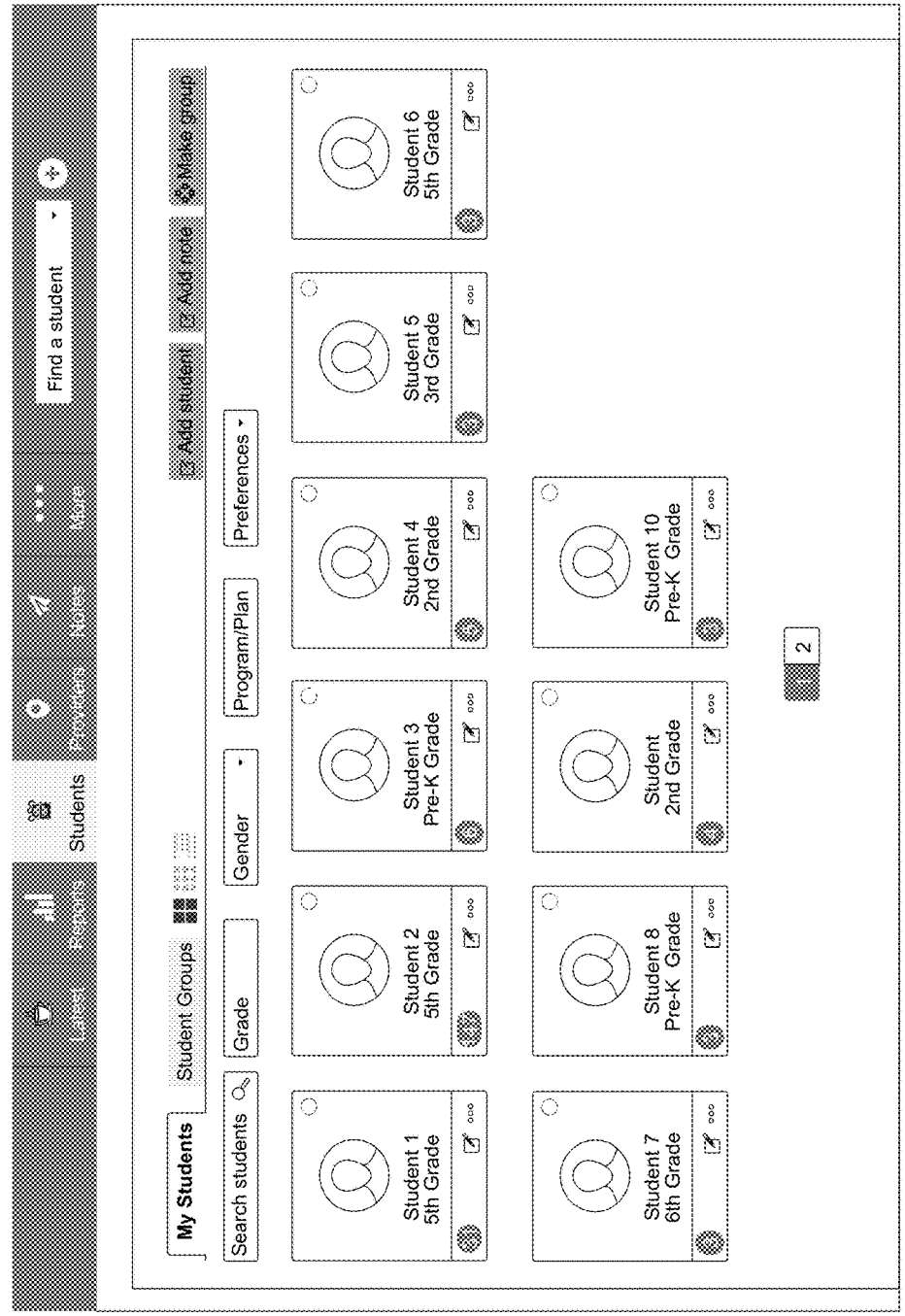
FIG. 18 is a sample student landing page, in accordance with one embodiment of the invention.

FIG. 18 is an exemplary student landing page showing the options available to the user of the education data platform system of FIG. 1, in accordance with one embodiment of the invention. The user can view all of the students he/she has access to, navigate to those students, add notes for one or more students, and/or create groups of those students. The user can also switch to view all of user's groups from the "student groups" tab.

Each of the above-identified processes corresponds to a set of instructions for performing a function described above. The above-identified programs or sets of instructions need not be implemented as separate software programs, procedures or modules, and thus various subsets of these modules may be combined or otherwise re-arranged in various embodiments. For example, embodiments may be constructed in which steps are performed in an order different than illustrated, steps are combined, or steps are performed simultaneously, even though shown as sequential steps in illustrative embodiments. Also, the terminology used herein is for the purpose of description and should not be regarded as limiting. The use of "including," "comprising," "having," "containing" and variations thereof herein, is meant to encompass the items listed thereafter and equivalents thereof as well as additional items.

Various known updates may also be made to the education data platform system within the framework of the current invention. For example, additional users with access rights and privileges may be added to the system. Additional note, tracker, and event types and subtypes may be added to the system. Additional questions, characteristics, subjects, and needs may be added to the Needs Mapper survey. Additional end user role types, e.g. students of different ages can complete the Needs Mapper survey, with associated modifications to language and questions based on age and role of the end user. New provider types may also be added, along with additional data collected about the providers and number of students served. Further, variations of reports may be developed to incorporate new data being tracked and different algorithmic correlations, presentation order, and sequence based on narrative and the behavior nudge being employed.

The above-described embodiments of the present invention may be implemented in any of numerous ways. For example, the embodiments may be implemented using various combinations of hardware and software and communication protocol(s). Any standard communication or network protocol may be used and more than one protocol may be utilized. For the portion implemented in software, the software code may be executed on any suitable processor or collection of processors, whether provided in a single computer or distributed among multiple computers. Such processors may be implemented as integrated circuits, with one or more processors in an integrated circuit component, or any other suitable circuitry. Further, it should be appreciated that a computer may be embodied in any of a number of forms, such as a rack-mounted computer, a desktop computer, a laptop computer, single board computer, microcomputer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, the various methods or processes outlined herein may be coded as software that is executable on one or more processors that employ any one of a variety of operating systems or platforms. Additionally, such software may be written using any of a number of suitable programming languages and/or programming or scripting tools or a combination of programming languages, and also may be compiled as executable machine language code or intermediate code that is executed on a framework or a virtual machine. In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. Preferred computer readable storage media are non-transitory media, which may retain information for a sufficient time to provide computer-executable instructions in a non-transitory form.

The terms "program" or "software" are used herein in a generic sense to refer to any type of computer code or set of computer-executable instructions that may be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention. Computer-executable instructions may be in many forms, such as program modules, executed by one or more computers or other devices. Also, data structures may be stored in non-transitory computer-readable media in any suitable form. Any suitable mechanism may be used to establish a relationship between information in fields of a data structure, including the use of pointers, tags, or other mechanisms that establish relationships between data elements.

It is to be understood that the above-described embodiments are only illustrative of the application of the principles of the present invention. The illustrative discussions above are not intended to be exhaustive or to limit the invention to the precise forms disclosed. Various modifications and alternative applications may be devised by those skilled in the art in view of the above teachings and without departing from the spirit and scope of the present invention and the following claims are intended to cover such modifications, applications, and embodiments.

What is claimed is:

1. A performance tracking and management system for providing educational services to students, the system comprising:
 (a) a computer-readable relational database containing data for each of a plurality of students;
  (i) wherein said data comprises information about the students' academic performance, skills, and risk factors, and non-academic experience, and needs; and
  (ii) wherein said data comprises information about one or more interventions, information about providers of the interventions, and the outcomes of interventions in the students' past; and
 (b) a computer server operatively coupled to the computer-readable database and programmed with a plurality of application programming interfaces (APIs), each API configured to:
  (i) receive from a web browser of a computer user a request for information about a student;

(ii) determine if the user making the request is authorized or permitted to receive the requested information;
(iii) if the user is authorized to receive the requested information, retrieve the requested information from the relational database or from another database having the requested information;
(iv) using the information retrieved, automatically generate and transmit to the web browser the requested information and/or visual representations of the information; and
(v) receive and store in the database data entered by the user or generated by the system wherein
the system recommends one or more interventions based on a plurality of weighted factors selected from the group comprising the student's academic performance, academic needs, non-academic experience, non-academic needs, skills, and risk factors, and
wherein the system receives requests for information, transmits the requested information and/or visual representations of the information, and receives and stores in the database data entered by the user, via an API selected by the user, the API being one of the plurality of APIs.

2. The system of claim 1, wherein the one or more recommended interventions is tracked and adjusted based on the student's progress.

3. The system of claim 1, wherein the recommended interventions are based on a combination of student's academic performance and non-academic experience.

4. The system of claim 1, wherein the recommended interventions are based on a combination of student's needs and non-academic experience.

5. The system of claim 1, wherein the weighted factors are based on student, school, family, and community factors.

6. The system of claim 1, wherein the recommended interventions include having a circle of support for each student comprising one or more in-school and one or more out-of-school caregivers based on student's needs and experience.

7. The system of claim 1, wherein all of the data and information for each student are combined into a single unified record.

8. The system of claim 1, wherein the computer server is further programmed to monitor the student's performance over time against pre-selected standards.

9. The system of claim 1, wherein the system is accessible to disparate groups of education professionals, each group having different levels of privacy access.

10. A computer-implemented method for tracking and managing students' performance and providing educational services to students, comprising executing on a processor the steps of:
(a) receiving from a web browser of a computer user a request for information about a student;
(b) determining if the user making the request is authorized or permitted to receive the requested information;
(c) if the user is authorized to receive the requested information, retrieving the requested information from a computer-readable relational database;
(d) generating and transmitting to the web browser the retrieved information and/or visual representations of the information;
(e) receiving and storing in the database data entered by the user or generated by the system; and
(f) recommending interventions based on weighted factors selected from the group comprising the student's academic performance, academic needs, non-academic experience, skills, and risk factors;
wherein the computer-readable relational database contains data for each of a plurality of students, and
  (i) said data comprises information about the students' academic performance, skills, and risk factors, and non-academic experience, and needs; and
  (ii) said data comprises information about one or more interventions, information about providers of the interventions, and the outcomes of interventions in the students' past.

11. A non-transitory computer-readable medium for tracking and managing students' performance and providing educational services to students, comprising instructions stored thereon, that when executed on a processor, perform the steps of:
(a) receiving from a web browser of a computer user a request for information about a student;
(b) determining if the user making the request is authorized or permitted to receive the requested information;
(c) if the user is authorized to receive the requested information, retrieving the requested information from a computer-readable relational database;
(d) generating and transmitting to the web browser the retrieved information and/or visual representations of the information; and
(e) receiving and storing in the database data entered by the user or generated by the system; and
(f) recommending interventions based on weighted factors selected from the group comprising the student's academic performance, academic needs, non-academic experience, skills, and risk factors;
wherein the computer-readable relational database contains data for each of a plurality of students, and
  (i) said data comprises information about the students' academic performance, skills, and risk factors, and non-academic experience, and needs; and
  (ii) said data comprises information about one or more interventions, information about providers of the interventions, and the outcomes of interventions in the students' past.

* * * * *